United States Patent
Tsujimura et al.

(10) Patent No.: US 10,831,361 B2
(45) Date of Patent: Nov. 10, 2020

(54) CONTROL PANEL FOR MACHINE TOOLS AND MANAGEMENT SYSTEM FOR MACHINE TOOLS

(71) Applicant: JTEKT Corporation, Osaka (JP)

(72) Inventors: Kazuhiro Tsujimura, Okazaki (JP); Tomokazu Takayama, Ichinomiya (JP); Takahito Umeki, Toyota (JP); Masanori Ando, Nishio (JP); Hiroyuki Tsusaka, Nagoya (JP)

(73) Assignee: JTEKT Corporation, Osaka (JP)

( * ) Notice: Subject to any disclaimer, the term of this patent is extended or adjusted under 35 U.S.C. 154(b) by 507 days.

(21) Appl. No.: 15/459,636

(22) Filed: Mar. 15, 2017

(65) Prior Publication Data
US 2017/0269811 A1    Sep. 21, 2017

(30) Foreign Application Priority Data

Mar. 17, 2016  (JP) .................................. 2016-053177
Mar. 17, 2016  (JP) .................................. 2016-053178
Mar. 17, 2016  (JP) .................................. 2016-053179

(51) Int. Cl.
*G06F 3/0488* (2013.01)
*G05B 19/409* (2006.01)
(Continued)

(52) U.S. Cl.
CPC ......... *G06F 3/0488* (2013.01); *G05B 19/406* (2013.01); *G05B 19/409* (2013.01);
(Continued)

(58) Field of Classification Search
CPC .. G06F 3/0488; G06F 3/04817; G06F 3/0482; G05B 19/406; G05B 19/409; G05B 2219/36076; G05B 2219/36143
See application file for complete search history.

(56) References Cited

U.S. PATENT DOCUMENTS

2007/0113199 A1*  5/2007  Lausterer ............. G05B 19/106
                                                      715/810
2010/0023156 A1*  1/2010  Trepina ................ G05B 19/406
                                                      700/175
(Continued)

FOREIGN PATENT DOCUMENTS

JP          5-150818       6/1993
JP          6-301832 A    10/1994
(Continued)

OTHER PUBLICATIONS

Japanese Office Action dated Nov. 5, 2019, in Patent Application No. 2016-053177, 14 pages (with unedited computer generated English translation).
(Continued)

*Primary Examiner* — Andrew T Chiusano
(74) *Attorney, Agent, or Firm* — Oblon, McClelland, Maier & Neustadt, L.L.P.

(57) ABSTRACT

To provide a control panel for machine tools that improves operability and enables even an unskilled person to easily grasp a procedure for moving a screen to a target screen. A plurality of screen data are classified into a plurality of groups and classified into main screen data and sub-screen data associated with the main screen data in each of the groups. A control section displays the main screen data and displays the sub-screen data on a display section according to a type of an input to a plurality of main screen corresponding buttons.

8 Claims, 17 Drawing Sheets

(51) Int. Cl.
  *G06F 3/0482* (2013.01)
  *G05B 19/406* (2006.01)
  *G06F 3/0481* (2013.01)

(52) U.S. Cl.
  CPC ........ *G06F 3/0482* (2013.01); *G06F 3/04817* (2013.01); *G05B 2219/36076* (2013.01); *G05B 2219/36143* (2013.01)

(56) References Cited

U.S. PATENT DOCUMENTS

| | | | | |
|---|---|---|---|---|
| 2011/0144795 A1* | 6/2011 | Liu | ...................... | G05B 19/406 700/177 |
| 2012/0254804 A1* | 10/2012 | Sheha | .................... | G06Q 30/02 715/834 |
| 2014/0068516 A1* | 3/2014 | Escobedo | ........... | G06F 3/04817 715/835 |
| 2014/0181752 A1* | 6/2014 | Kim | ....................... | G05B 19/18 715/835 |
| 2017/0245444 A1* | 8/2017 | Savuoja | .................... | G07C 5/08 |

FOREIGN PATENT DOCUMENTS

| | | |
|---|---|---|
| JP | 7-152411 A | 6/1995 |
| JP | 8-123523 A | 5/1996 |
| JP | 8-272416 A | 10/1996 |
| JP | 2003-122427 A | 4/2003 |
| JP | 2003-186508 | 7/2003 |
| JP | 2004-38565 | 2/2004 |
| JP | 2004-318262 A | 11/2004 |
| JP | 4023051 | 12/2007 |
| JP | 4044169 | 2/2008 |
| JP | 2010-238085 A | 10/2010 |
| JP | 2012-79314 A | 4/2012 |
| JP | 2014-81762 | 5/2014 |
| JP | 2014-110015 A | 6/2014 |
| JP | 2015-56114 A | 3/2015 |
| JP | 2015-153214 A | 8/2015 |
| WO | WO 2015/104390 A1 | 7/2015 |

OTHER PUBLICATIONS

Japanese Office Action dated Nov. 5, 2019, in Patent Application No. 2016-053178, 12 pages (with unedited computer generated English translation).

Japanese Office Action dated Nov. 5, 2019, in Patent Application No. 2016-053179, 10 pages (with unedited computer generated English translation).

* cited by examiner

| GROUP | MAIN SCREEN DATA (22) | MAIN SCREEN CORRESPONDING BUTTON | LIST DISPLAY DATA (24) | SUB-SCREEN DATA (23) |
|---|---|---|---|---|
| G1 | OPERATION STATE | | | MANUAL HANDLE INTERRUPT |
| G2 | PROGRAM LIST | | | MACRO |
| | | | | WORK COORDINATE |
| G3 | TOOL LIST | | | TOOL CORRECTION |
| | | | | MACRO |
| G4 | ROUTINE INSPECTION | | | |
| G5 | MONITOR | | | SIGNAL STATE |
| | | | | OPERATION RESULT |
| | | | | MACHINING RESULT |
| | | | | ENERGY MONITORING |
| | | | | REAL-TIME HEAT DISPLACEMENT |
| | | | | LIFE MANAGEMENT |
| G6 | MAINTENANCE | | | |
| G7 | SYSTEM | | | SYSTEM MANAGEMENT |
| | | | | BACKUP MANAGEMENT |
| | | | | REAL-TIME HEAT DISPLACEMENT SETTING |
| G8 | HELP | | | |
| G9 | ALARM | | | |
| G10 | MESSAGE BOARD | | | |

FIG.3

| NAME | APPARATUS SIGN | ADDRESS | SIGNAL STATE |
|---|---|---|---|
| SWIVELING TABLE LOWERING | 1SOL2 | Y0027.5 | ○ |
| | 1LS1 | X0031.0 | □ |
| SWIVELING TABLE LIFTING | 1SOL1 | Y0027.4 | ○ |
| | 1LS2 | X0031.1 | □ |
| TABLE TIGHTENING | 1SOL2 | Y0027.5 | ○ |
| | 1PS1 | X0031.0 | □ |
| TABLE LOOSENING | 1SOL1 | Y0027.4 | ○ |
| | 1PS2 | X0031.1 | □ |

FIG.23

| NAME | APPARATUS SIGN | ADDRESS | SIGNAL STATE |
|---|---|---|---|
| SWIVELING TABLE LOWERING | 1SOL2 | Y0027.5 | ● |
| | 1LS1 | X0031.0 | □ |
| SWIVELING TABLE LIFTING | 1SOL1 | Y0027.4 | ○ |
| | 1LS2 | X0031.1 | □ |
| TABLE TIGHTENING | 1SOL2 | Y0027.5 | ○ |
| | 1PS1 | X0031.0 | □ |
| TABLE LOOSENING | 1SOL1 | Y0027.4 | ○ |
| | 1PS2 | X0031.1 | □ |

FIG.24

CONTROL PANEL FOR MACHINE TOOLS AND MANAGEMENT SYSTEM FOR MACHINE TOOLS

CROSS REFERENCE TO RELATED APPLICATIONS

This application claims priority based on Japanese Patent Application No. 2016-053177 filed on Mar. 17, 2016, Japanese Patent Application No. 2016-053178 filed on Mar. 17, 2016, and Japanese Patent Application No. 2016-053179 filed on Mar. 17, 2016, the entire contents of which are incorporated by reference herein.

TECHNICAL FIELD

The present invention relates to a control panel for machine tools and a management system for machine tools.

BACKGROUND ART

As a control panel for machine tools, for example, a control panel for machine tools described in Japanese Patent No. 4023051 is known. Japanese Patent No. 4023051 mentions that the control panel for machine tools includes a touch panel and displays operation buttons to visually distinguish the operation buttons according to states of input and output signals between the control panel for machine tools and a sequence controller.

Japanese Patent No. 4044169 mentions that a flow of a process is displayed as icon images and information concerning steps corresponding to the icon images is displayed on a control panel. Japanese Unexamined Patent Application Publication No. 2014-81762 (JP2014-81762A) describes a control panel that displays a target input screen according to operation of a jump button.

A machine tool includes various maintenance target objects. Therefore, an operator performs a routine inspection of the machine tool and performs replacement of a maintenance target object that is close to the end of the life thereof. Japanese Unexamined Patent Application Publication No. 2003-186508 (JP2003-186508A) describes software for performing life management of maintenance target objects.

Japanese Unexamined Patent Application Publication No. 2004-38565 (JP2004-38565A) describes an apparatus that controls a virtual model on the basis of a control signal and an operation response signal, converts the virtual model into a three-dimensional mode, and displays the three-dimensional model. With the apparatus, it is possible to monitor the operation and a state of a machine tool on a real time basis and it is possible to quickly specify an abnormality occurrence part.

Japanese Unexamined Patent Application Publication No. 05-150818 (JP05-150818A) mentions that content of a sequence program and a signal of a driving state of a sensor are compared to emit an alarm when abnormality occurs and, when the alarm is emitted, sensors are displayed as an arrangement plan or a table according to keyboard operation. Consequently, it is possible to perform a failure diagnosis by displaying switches and solenoid valves related to the present operation and displaying actuation states of ON/OFF of the switches and the solenoid valves.

However, there are a large number of pieces of information that should be displayed on a control panel. Accordingly, there are a large number of screen data. Therefore, an operator cannot display target information unless the operator is familiar with an operation method for screens.

SUMMARY OF INVENTION

Problems to be Solved by Invention

A first object of the present invention is to provide a control panel for machine tools that improves operability and enables even an unskilled person to easily grasp a procedure for moving a screen to a target screen.

In general, maintenance target objects are set by a manufacturer in advance. Further, a period of a routine inspection and a rate of use with respect to life for replacing the maintenance target objects are also set by the manufacturer. Usually, the manufacturer performs the setting in advance taking into account high safety. However, it is desired that a user can perform more appropriate setting concerning a routine inspection period, a replacement period, and the like through use for many years and experiences.

A second object of the present invention is to provide, concerning management of maintenance target objects, a management system for machine tools that facilitates the management and has satisfactory operability.

Although it is easy for an operator to recognize a state of abnormality, there is still room of improvement. A third object of the present invention is to provide a management system for machine tools that enables the operator to more clearly grasp a state of a machine tool.

Means for Solving the Problems (1. Control Panel for Machine Tools)

A control panel for machine tools includes: a screen-data storing section configured to store a plurality of screen data including operation buttons and for displaying machine data of a machine tool; a display section configured to display at least one of the plurality of screen data; an input section configured to receive an input to the operation button of the screen data displayed on the display section; and a control section configured to change, on the basis of the input to the operation button displayed on the display section, the screen data displayed on the display section.

The plurality of screen data are classified into a plurality of groups and classified into main screen data and sub-screen data associated with the main screen data in the groups. The screen-data storing section further stores list display data in which the sub-screen data in the groups are displayed as lists. All of the plurality of screen data include, as the operation buttons in the constant display region, a plurality of main screen corresponding buttons respectively associated with the main screen data.

When receiving a first input on one of the plurality of main screen corresponding buttons, the control section displays the main screen data corresponding to the main screen corresponding button on the display section. When receiving a second input different from the first input on one of the plurality of main screen corresponding buttons, the control section displays the list display data of the sub-screen data related to the main screen data corresponding to the main screen corresponding button on the display section. When receiving an input to the list display data, the control section displays the sub-screen data corresponding to the list display data on the display section.

That is, the plurality of screen data are grouped and classified into one main screen data and one or a plurality of sub-screen data in each of the groups. Further, a constant display region is set for all of the screen data. The main screen corresponding buttons corresponding to the groups are displayed in the constant display region. Therefore, the operator can easily grasp from the constant display region that information included in a target group is displayed.

Further, display of the main screen data and list display of the sub-screen data are distinguished according to an operation method on the main screen corresponding buttons in the constant display region. Specifically, when the operator performs the first input on the main screen corresponding button, the main screen data corresponding to the main screen corresponding button is displayed. On the other hand, when the operator performs the second input on the main screen corresponding button, the list display data of the sub-screen data is displayed. After the list display data is displayed, if the operator performs input operation to anyone of the lists, the sub-screen data corresponding to the list is displayed. In this way, irrespective of which screen data is displayed, it is extremely easy for the operator to grasp operation for displaying target screen data.

In particular, the grouped screen data are classified into the main screen data and the sub-screen data. Therefore, it is possible to easily display the main screen data simply by performing the first input on the main screen corresponding button. In this way, the screen data having a high viewing frequency in the groups is set as the main screen data. Therefore, it is possible to display target screen data with less operation.

As explained above, with the control panel for machine tools, since operability is improved, even an unskilled person can easily grasp a procedure for moving a screen to a target screen.

(2. First Management System for Machine Tools)

A first management system for machine tools includes: a screen-data storing section configured to store screen data for displaying maintenance information of maintenance target objects of a machine tool; a display section provided in a control panel for machine tools and configured to display the screen data; an input section configured to receive an input to the screen data displayed on the display section; a management-information storing section configured to store management information including at least one of maintenance periods and maintenance frequencies for the respective maintenance target objects; a present-state-information storing section configured to store present state information including at least one of use periods and use frequencies for the respective maintenance target objects; and a control section configured to display the management information and the present state information on the display section.

When setting of the management information is performed by the input to the screen data displayed on the display section, the control section stores the set management information in the management-information storing section. Further, when an input of the present state information is performed by the input to the screen data displayed on the display section, the control section stores the input present state information in the present-state-information storing section.

The operator can freely set the management information of the maintenance target objects using the control panel for machine tools. For example, when a routine inspection is performed or replacement of the maintenance target objects is performed, the operator inputs, in the input section of the control panel for machine tools, the present state information such as completion of execution of the routine inspection or completion of the replacement. Therefore, update of the present state information of the maintenance target objects stored in the present-state-information storing section is performed. In this way, concerning the management of the maintenance target objects, the management is facilitated and operability is improved.

(3. Second Management System for Machine Tools)

A second management system for machine tools includes: a screen-data storing section configured to store screen data for displaying machine data of a machine tool; a display section provided in a control panel for machine tools and configured to display the screen data; an input section configured to receive an input to the screen data displayed on the display section; and a control section configured to acquire an ON/OFF actual operation state of an operation target object and ON/OFF operation command information for the operation target object and display the ON/OFF actual operation state and the ON/OFF operation command information on the display section.

That is, the ON/OFF actual operation state and the ON/OFF operation command information of the operation target object are displayed on the display section of the control panel for machine tools. An operator determines that the operation target object is normal when the ON/OFF actual operation state and the ON/OFF operation command information coincide with each other and determines that the operation target object is abnormal when the ON/OFF actual operation state and the ON/OFF operation command information do not coincide with each other. In this way, both of the ON/OFF actual operation state and the ON/OFF operation command information are displayed on the display section of the control panel for machine tools. Therefore, the operator can grasp at a glance whether the operation target object is normal or abnormal. In a state in which the operator grasps both of the ON/OFF actual operation state and the ON/OFF operation command information, the operator can check an actual state of the operation target object. Therefore, it is easy for the operator to grasp an abnormal state according to one kind of screen information.

BRIEF DESCRIPTION OF THE DRAWINGS

FIG. 3 shows grouping of main screen data and sub-screen data shown in FIG. 2.

FIG. 23 is an enlarged diagram of list display of input/output information shown in FIG. 22 and is a diagram of a normal state.

FIG. 24 is an enlarged diagram of the list display of the input/output information shown in FIG. 22 and is a diagram of an abnormal state concerning swiveling table lowering operation.

DETAILED DESCRIPTION OF EMBODIMENTS (1. Overview)

A machine tool 1 includes a control panel for machine tools (hereinafter referred to as control panel) 6. In general, the control panel 6 is provided integrally with the machine tool 1. However, the control panel 6 may be provided in a position separate from the machine tool 1 via, for example, a network line (including wired and wireless). Further, apart of the control panel 6 may be provided integrally with the machine tool 1 and the remaining part may be provided in a position separate from the machine tool 1.

In the machine tool 1, a management system for machine tools is provided in order to manage maintenance, abnormality, and the like of the machine tool 1. The management system for machine tools may be configured by the control panel 6 or may be configured by a device separate from the control panel 6. For example, the management system for machine tools may be provided in a host computer (not shown in the figure) for supervising a production line or may be configured by a dedicated device. Further, a part of the management system for machine tools may be provided in the control panel 6 and the remaining part may be provided separately from the control panel 6. In this embodiment, an example is explained in which the management system for machine tools is configured by the machine tool 1.

(2. Configuration of the Machine Tool 1)

Figure 1:
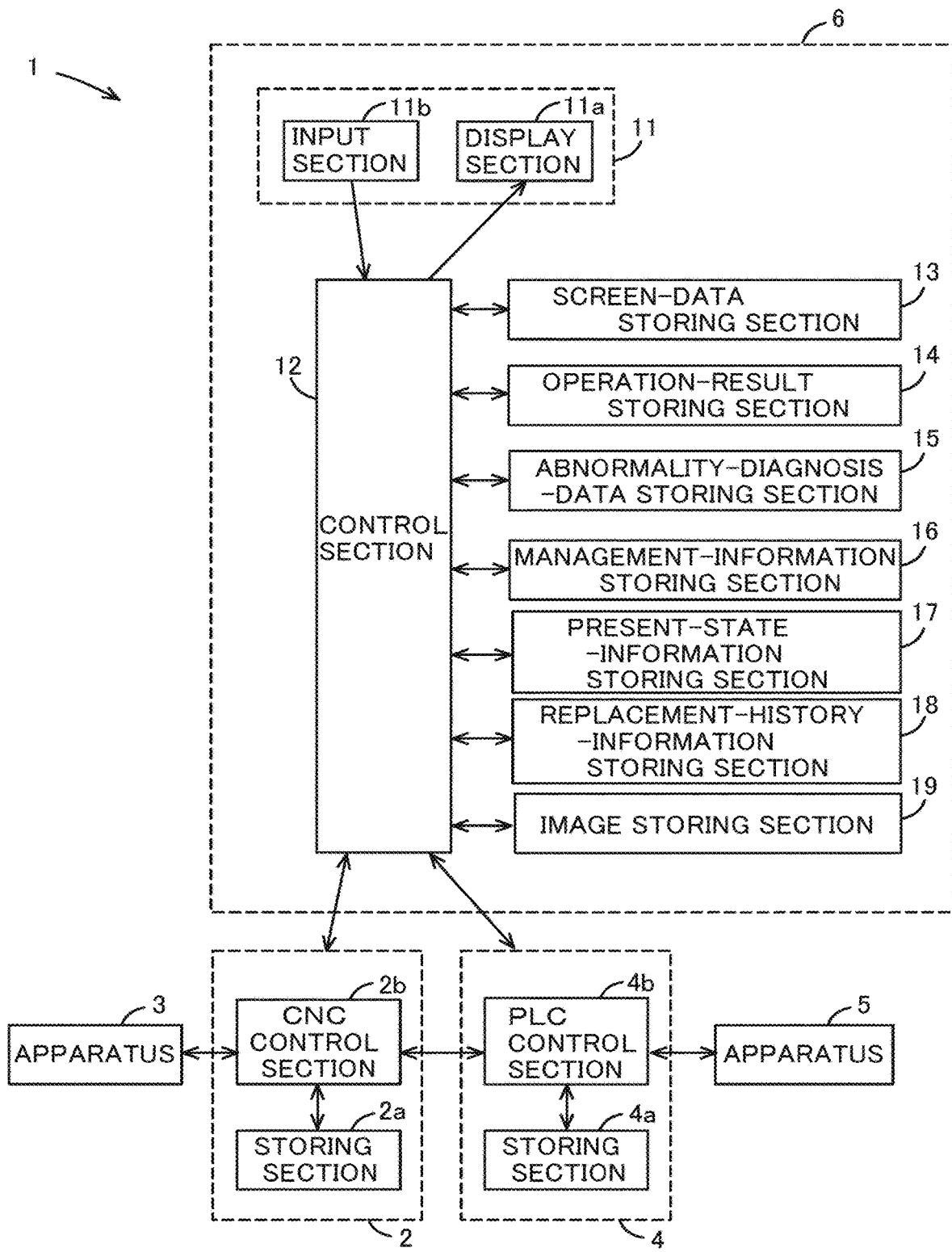
FIG. 1 is a block configuration diagram of a machine tool.

The machine tool 1 (including the management system for machine tools) including the control panel 6 is explained with reference to FIG. 1. The machine tool 1 includes a CNC (computerized numerical control) device 2, a plurality of apparatuses 3 controlled by the CNC device 2, a PLC (programmable logic controller) 4, a plurality of apparatuses 5 controlled by the PLC 4, and the control panel 6. As the pluralities of apparatuses 3 and 5, there are a motor, a motor amplifier, an automatic tool changer (ATC), a coolant device, a spindle lubricating device, and the like.

The CNC device 2 includes a storing section 2a that stores various machine data and a CNC control section 2b that controls the plurality of apparatuses 3 using the machine data stored in the storing section 2a. The PLC 4 includes a storing section 4a that stores various machine data and a CNC control section 4b that controls the plurality of apparatuses 5 using the machine data stored in the storing section 4a.

The control panel 6 includes a display device 11, a control section 12, a screen-data storing section 13, an operation-result storing section 14, an abnormality-diagnosis-data storing section 15, a management-information storing section 16, a present-state-information storing section 17, a replacement-history-information storing section 18, and an image storing section 19. The display device 11 includes a display section 11a that displays various data on a display screen and an input section 11b that receives an input (including selection) to an operation button of screen data displayed on the display section 11a.

In this embodiment, the display device 11 is, for example, a touch panel. The input section 11b receives a touch input by the operator. The display device 11 may be displays such as a liquid crystal display and a plasma display, a display device including a curved screen, a display device capable of performing three-dimensional display, and the like. Note that the display device 11 is not limited to the touch panel and can be various display devices. Further, the input section 11b can be a device separate from the display device 11, for example, various input devices such as a pointing device (pointer display on a screen) and a wearable input operation device. As the wearable input operation device, for example, a device worn on a finger, a device worn like eyeglasses, and the like can be applied.

The control section 12 changes, on the basis of an input to the operation button displayed on the display section 11a, screen data displayed on the display section 11a. When displaying the screen data on the display section 11a, the control section 12 acquires data from the CNC device 2 and the PLC 4. The control section 12 outputs information input to the input section 11b to the CNC device 2 and the PLC 4.

The screen-data storing section 13 stores a plurality of screen data for displaying machine data of the machine tool 1 on the display section 11a. The screen data includes a frame and operation buttons for displaying various parameters. The frame includes addresses of link destinations of the displayed various parameters.

The operation-result storing section 14 stores operation result data of the machine tool 1. The operation result data is stored according to a work shift of an operator of the machine tool. The abnormality-diagnosis-data storing section 15 stores abnormality diagnosis data automatically collected during abnormality of the machine tool 1.

The management-information storing section 16 stores management information for respective maintenance target objects. The management information includes maintenance periods such as periods to life values of the maintenance target objects and a period of a routine inspection, maintenance frequencies, which are the life values of the maintenance target objects, count-up conditions for counting up use frequencies concerning the respective maintenance target objects, notification conditions equivalent to predetermined ratios to the life values, and re-notification conditions equivalent to the predetermined ratios to the life values.

The present-state-information storing section 17 stores present state information for the respective maintenance target objects. The present state information includes use periods of the maintenance target objects after maintenance processing and use frequencies of the maintenance target objects after the maintenance processing. The replacement-history-information storing section 18 stores replacement history information for the respective maintenance target objects.

The image storing section 19 stores images displayed in screen data for checking a signal state of a facility. The stored images are images associated with operation target objects that carry out ON/OFF operation.

Note that the first management system for machine tools includes at least the display device 11, the control section 12, the screen-data storing section 13, the management-information storing section 16, the present-state storing section 17, and the replacement-history-information storing section 18. The second management system for machine tools includes at least the display device 11, the control section 12, the screen-data storing section 13, and the image storing section 19.

(3. Types of Screen Data)

Figure 2:
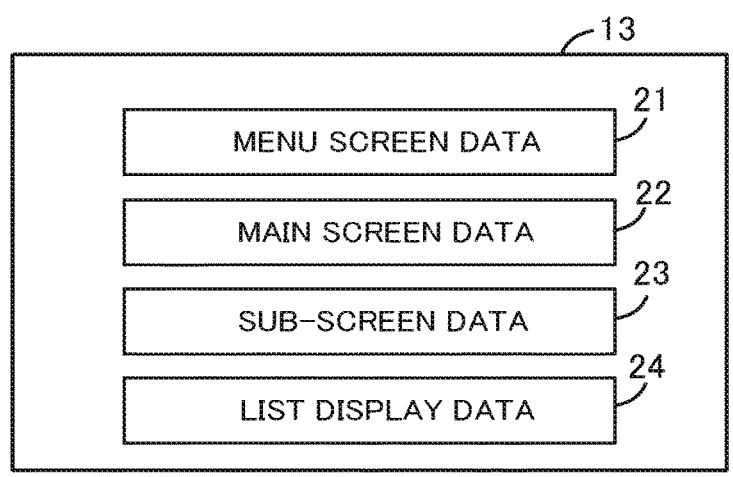
FIG. 2 shows data stored in a screen-data storing section shown in FIG. 1.

Types of screen data stored in the screen-data storing section 13 are explained with reference to FIGS. 2 and 3. The screen data stored in the screen-data storing section 13 are, as shown in FIG. 2, one menu screen data 21, a plurality of main screen data 22, a plurality of sub-screen data 23, and a plurality of list display data 24.

The menu screen data 21, the main screen data 22, and the sub-screen data 23 are data targeting an entire screen region in the display section 11a. That is, an external shape of the menu screen data 21, the main screen data 22, and the sub-screen data 23 coincide with a display region of the display section 11a. The menu screen data 21 is a screen for making it easy to move to the main screen data 22 and the sub-screen data 23.

The main screen data 22 and the sub-screen data 23 are classified into groups G1 to G10 as shown in FIG. 3. Further, each of the groups G1 to G10 includes one main screen data 22. Further, each of the groups G1, G2, G3, G5, and G7 includes one or a plurality of sub-screen data 23. A main screen corresponding button shown in FIG. 3 is associated with each of the main screen data 22.

In this embodiment, a button with an icon is applied as the main screen corresponding button. The icon includes a figure and a text, which are colored in different colors. Note that a button with an icon including only a figure may be applied as the main screen corresponding button. A button with an icon including only a text may be applied as the main screen corresponding button.

The list display data 24 is data targeting only a partial region in the display section 11a. The list display data 24 is data in which the sub-screen data 23 are displayed as lists in the groups G1, G2, G3, G5, and G7. The list display data 24 includes icons of groups corresponding to the list display data 24 and names of sub-screen data corresponding to the list display data 24. Further, the list display data 24 is not data displayed on the display section 11a alone but is data displayed to be superimposed on a near side in a state in which the other screen data 21, 22, and 23 are displayed on the display section 11a.

The group G1 includes operation state screen data as the main screen data and includes manual handle interrupt screen data as the sub-screen data. The group G2 includes program list screen data as the main screen data and includes macro screen data and work coordinate screen data as the sub-screen data. The group G3 includes tool list screen data as the main screen data and includes tool correction screen data and macro screen data as the sub-screen data. On a macro screen, constants and variables of a machining program and tool data can be viewed, referred to, and changed.

The group G4 includes routine inspection screen data as the main screen data. The group G5 includes monitor screen data as the main screen data and includes signal state screen data, operation result screen data, machining result screen data, energy monitoring screen data, real-time heat displacement screen data, and life management screen data as the sub-screen data. The group G6 include retained screen data as the main screen data.

The group G7 includes system screen data as the main screen data and includes system management screen data, backup management screen data, and real-time heat displacement setting screen data as the sub-screen data. Each of the groups G8 to G10 includes help screen data, alarm screen data, and message board screen data as the main screen data.

In this way, the functions of the machine tool are classified into a plurality of groups (main groups) for each of the functions and further classified into sub-groups (each of large classification groups is classified into a plurality of groups) to enable the operator to easily grasp the functions of the machine tool. The sub-groups can be classified into a plurality of stages. In this embodiment, the functions of the machine tool are classified into a plurality of groups, that is, an operation state of a machine, a machining program of the machine, tool information of machining, inspection (periodically testing individual inspection items of the machine), monitor (monitoring a state of the machine to keep the machine in a normal state), and maintenance (maintaining a normal state and the like of the machine) to enable the operator to easily grasp the functions of the machine tool. In particular, a function required to be immediately operated such as a function of notifying an abnormality state of the machine is classified differently from the classification explained above to enable the operator to easily grasp the function and easily operate the function.

(4. Overviews of the Menu Screen Data, the Main Screen Data, and the Sub-Screen Data)

Figure 4:
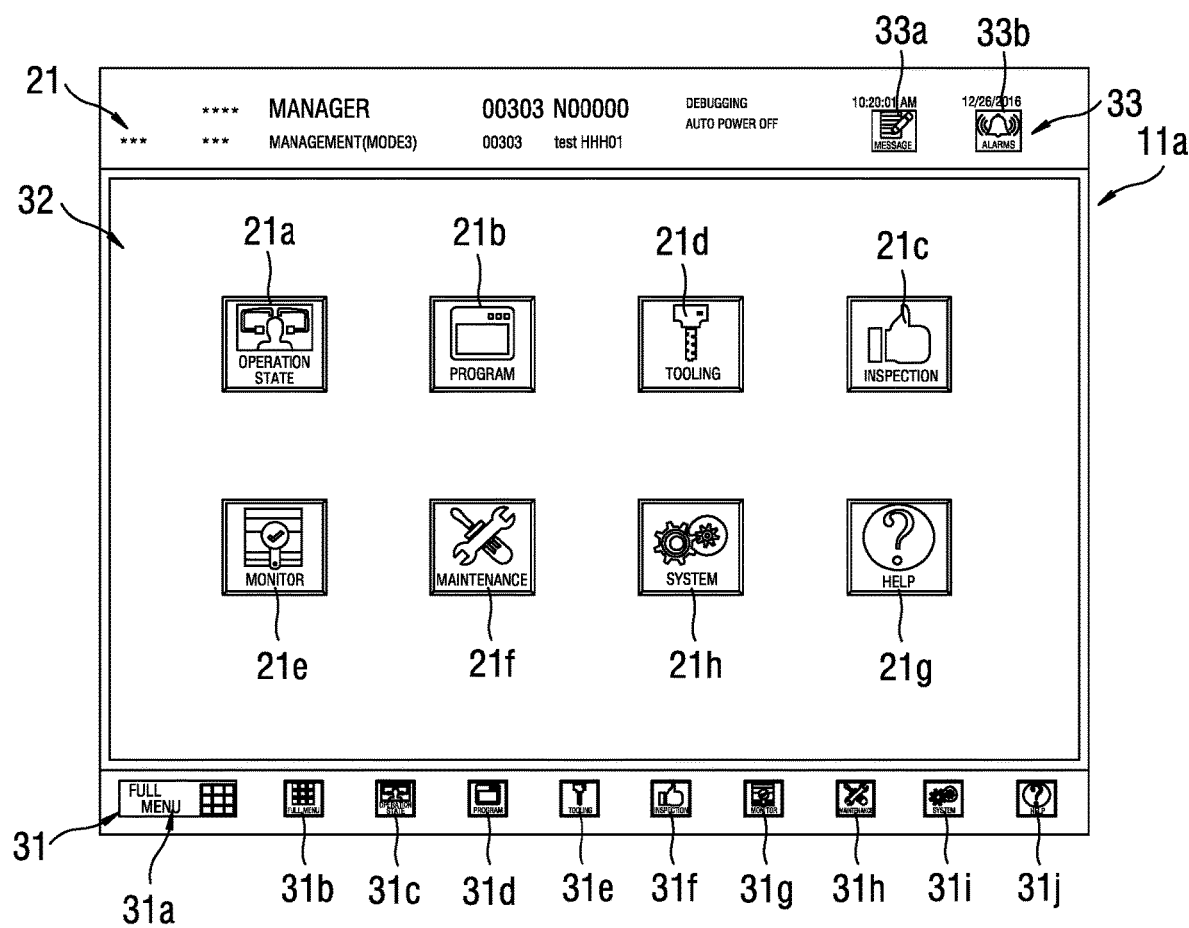
FIG. 4 is menu screen data shown in FIG. 2.

Overviews of the menu screen data 21, the main screen data 22, and the sub-screen data 23 are explained with reference to FIG. 4. FIG. 4 shows the menu screen data 21. As explained above, the screen data 21, 22, and 23 are data targeting the entire screen region in the display section 11a.

The screen data 21, 22, 23 have a configuration including a constant display region 31 constantly displayed in a lower part, a variable display region 32 that is most of a region in the center and where data corresponding to display content is displayed, and a second constant display region 33 mainly constantly displayed in an upper part.

The constant display region 31 is a region where the same content is displayed in all of the screen data 21, 22, and 23. That is, all of the screen data 21, 22, and 23 include information concerning the constant display region 31 common to the screen data 21, 22, and 23. The constant display region 31 includes, at the left end, a present icon 31a corresponding to a group currently displayed in the variable display region 32 and includes, on the right of the present icon 31a, as an operation button, a menu screen corresponding button 31b corresponding to the menu screen data 21. The constant display region 31 includes, on the right side of the menu screen corresponding button 31b, as operation buttons, main screen corresponding buttons 31c to 31j corresponding to the main screen data 22 of the groups G1 to G8.

The variable display region 32 is a region where different contents are displayed according to the screen data 21, 22, and 23. That is, the screen data 21, 22, and 23 respectively include different kinds of information in the variable display region 32. The second constant display region 33 is a region where the same content is displayed in most of the screen data 21, 22, and 23. That is, most of the screen data 21, 22, and 23 include information in the constant display region 31 common to the screen data 21, 22, and 23. The second constant display region 33 includes, at the right end, message board screen data 33a and alarm screen data 33b as operation buttons.

Further, as explained concerning the types of the screen data above, the respective screen data 21, 22, and 23 are associated with the other screen data 21, 22, and 23 and the list display data 24.

(5. Details of the Menu Screen Data)

Details of the menu screen data 21 are explained with reference to FIG. 4. The menu screen data 21 includes the constant display region 31, the variable display region 32, and the second constant display region 33. In the constant display region 31 and the second constant display region 33, the contents explained concerning the overview of the screen data are displayed.

The variable display region 32 of the menu screen data includes, as operation buttons, second main screen corresponding buttons 21a to 21h corresponding to the main screen data 22 of the groups G1 to G8. That is, in this embodiment, in the variable display region 32 of the menu screen data 21, operation buttons of the same kinds as the main screen corresponding buttons 31c to 31j displayed in the constant display region 31 are displayed. However, as the second main screen corresponding buttons 21a to 21h displayed in the variable display region 32 of the menu screen data 21, operation buttons different from the main screen corresponding buttons 31c to 31j displayed in the constant display region 31 may be displayed.

(6. Processing of the Control Section for the Constant Display Region)

Processing of the control section 12 for the constant display region 31 included in all of the screen data 21, 22, and 23 is explained with reference to FIG. 5. Since the constant display region 31 is included in all of the screen data 21, 22, and 23, the processing explained below can be executed not only when the menu screen data 21 is displayed on the display section 11a but also when any screen data 21, 22, and 23 are displayed.

The control section 12 determines whether an input is received on the menu screen corresponding button 31b by the input section 11b (step 1 (step is indicated as S in the following explanation)). When the input is received (Yes in S1), the control section 12 causes the display section 11a to display the menu screen data 21 (S2). On the other hand, when the input is not received (No in S1), the control section 12 performs the next processing without performing the processing.

Subsequently, the control section 12 determines whether an input to any one of the main screen corresponding buttons 31c to 31j is received (S3). When the input is not received (No in S3), the control section 12 performs return processing. When the input is received (Yes in S3), the control section 12 determines whether the input is a short-press input (a first input: e.g., short-time touch operation) or a long-press input (a second input: e.g., long-time touch operation) (S4).

When receiving the short-press input (the first input) on any one of the main screen corresponding buttons 31c to 31j (No in S4), the control section 12 displays the main screen data 22 corresponding to the main screen corresponding button on the display section 11a (S5). In this case, content displayed in the variable display region 32 of the display section 11a is changed to information in the variable display region 32 of the main screen data 22 corresponding to the main screen corresponding button. On the other hand, when receiving the long-press input (the second input) on any one of the main screen corresponding buttons 31c to 31j (Yes in S4), the control section 12 additionally displays the list display data 24 of the sub-screen data 23 related to the main screen data 22 corresponding to the main screen corresponding button on the display section 11a (S6). That is, on the display section 11a, the display of the screen data 21, 22, and 23 is continued and, at the same time, the list display data 24 corresponding to the screen data 21, 22, and 23 is displayed to be superimposed on the near side.

Subsequently, the control section 12 determines whether an input (selection) (e.g., the short-press input) to the displayed list display data 24 is received (S7). When the input is received (Yes in S7), the control section 12 displays the sub-screen data 23 corresponding to the list display data 24 on the display section 11a (S8). In this case, content displayed in the variable display region 32 of the display section 11a is changed to information in the variable display region 32 of the sub-screen data 23 corresponding to the list display data 24. On the other hand, when the input is not received, that is, when another input or the like is received (No in S7), the control section 12 performs return processing.

(7. Processing of the Variable Display Region 32 of the Menu Screen Data 21)

Figure 6:
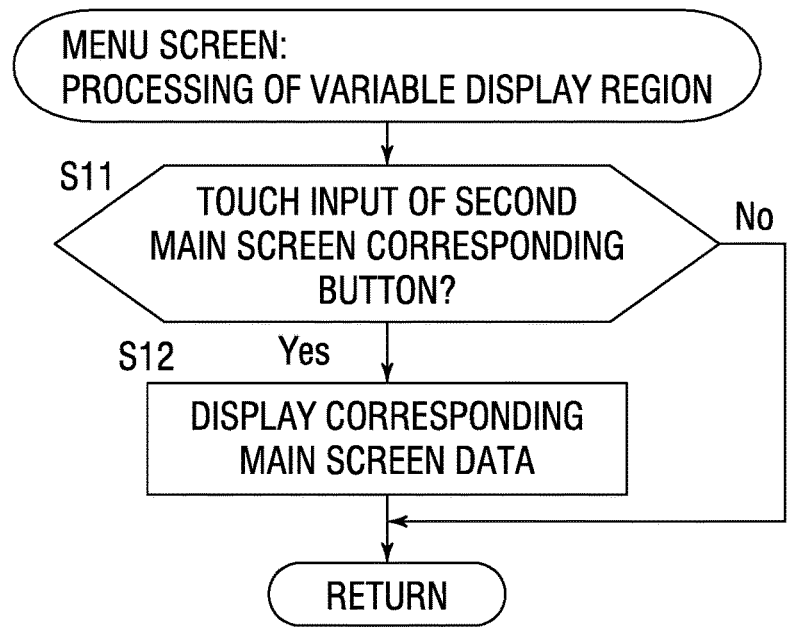
FIG. 6 is a flowchart for explaining processing of the control section shown in FIG. 1, the processing being performed on a variable display region of a menu screen shown in FIG. 4.

Processing of the control section 12 performed when an input to the variable display region 32 by the input section 11b is received when the menu screen data 21 shown in FIG. 4 is displayed on the display section 11a is explained with reference to FIG. 6. The variable display region 32 of the menu screen data 21 includes, as operation buttons, the second main screen corresponding buttons 21a to 21h corresponding to the main screen data 22 of the groups G1 to G8.

The control section 12 determines whether the short-press input (the first input) is received on any one of the second main screen corresponding buttons 21a to 21h (S11). When the input is received (Yes in S11), the control section 12 displays the main screen data 22 corresponding to the second main screen corresponding button on the display section 11a (S12). In this case, content displayed in the variable display region 32 of the display section 11a is changed to information in the variable display region 32 of the main screen data 22 corresponding to the second main screen corresponding button. On the other hand, when the input is not received (No in S11), the control section 12 performs return processing.

(8. Program Information Screen (the Group G2))

Display screens displayed on the display section 11a when the control section 12 receives an input to the main screen corresponding button 31d related to the program list of the group G2 among the main screen corresponding buttons 31c to 31j of the constant display region 31 of the screen data 21, 22, and 23 are explained with reference to FIGS. 7A to 7C and FIG. 8.

Figure 7A:
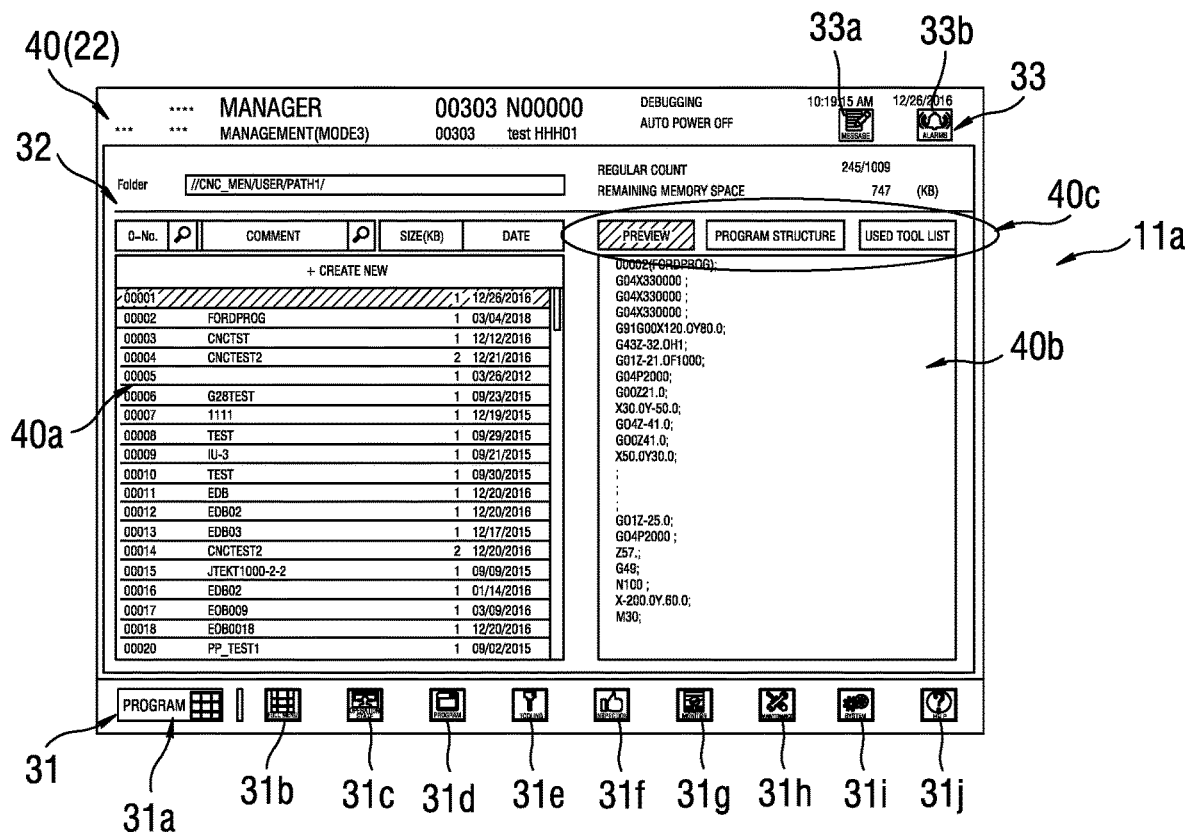
FIG. 7A is a display screen displayed on a display section when a first input (a short-press input) is performed on a program list button shown in FIG. 4.

When the short-press input to the main screen corresponding button 31d corresponding to program list screen data 40 (22) in the constant display region 31 is performed (S5 in FIG. 5) when any one of the screen data 21, 22, and 23 (and 24) is displayed on the display section 11a, a display screen shown in FIG. 7A is displayed on the display section 11a. When the short-press input to the second main screen corresponding button 21b corresponding to the program list screen data 40 (22) is performed (S12 in FIG. 6) when the menu screen data 21 shown in FIG. 4 is displayed on the display section 11a, the display screen shown in FIG. 7A is also displayed.

The program list screen data 40 (22) includes the constant display region 31 in a lower part, the variable display region 32 in most of a region in the center, and the second constant display region 33 in an upper part. The contents explained concerning the overview of the screen data are displayed in the constant display region 31 and the second constant display region 33.

The variable display region 32 of the program list screen data 40 (22) includes a list region 40a on the left side and includes a detailed information region 40b on the right side. Further, the program list screen data 40 includes a detailed information selection button 40c on the detailed information region 40b.

Display targets of the list region 40a are computer programs (information sources) stored in the CNC device 2, the PLC 4, or the like. A name list of the computer programs are displayed in the list region 40a. In the detailed information region 40b, detailed information related to a selected target selected out of the name list displayed in the list region 40a is displayed. A preview screen, which is a computer program itself of the selected target, is displayed in the detailed information region 40b shown in FIG. 7A.

Figure 7B:
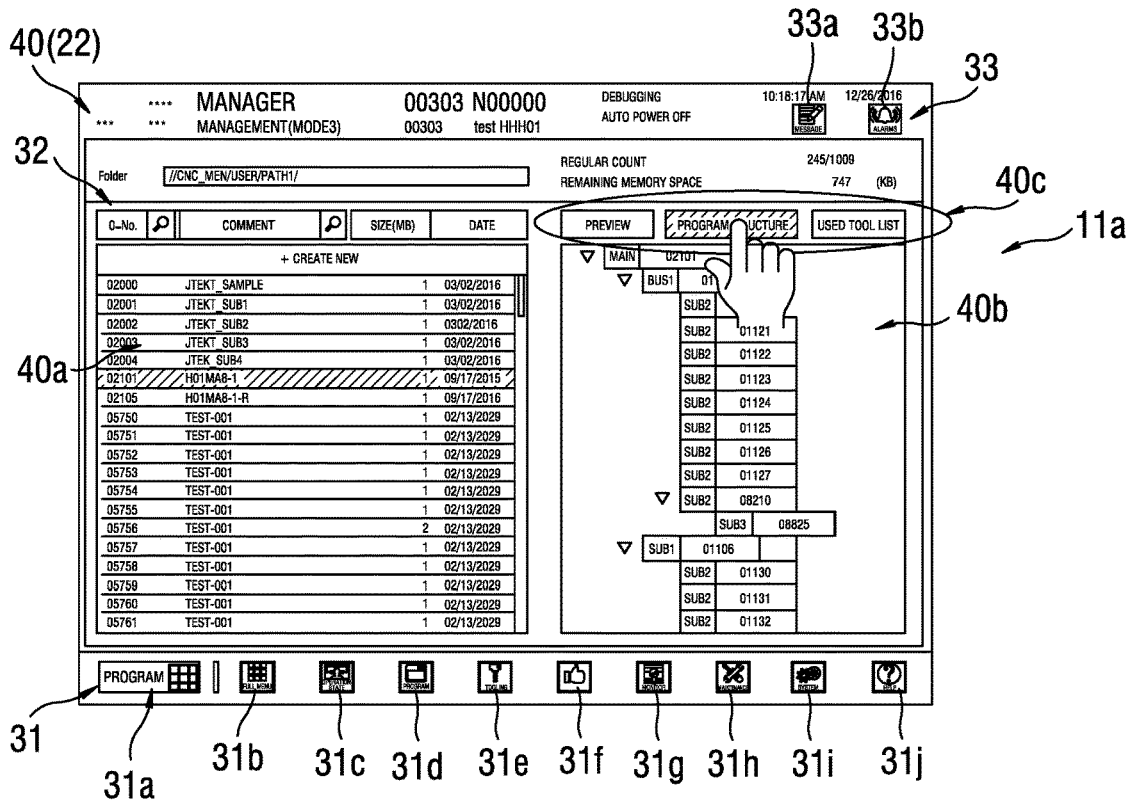
FIG. 7B is a display screen displayed on the display section when input operation is performed on a program configuration button shown in FIG. 7A.
Figure 7C:
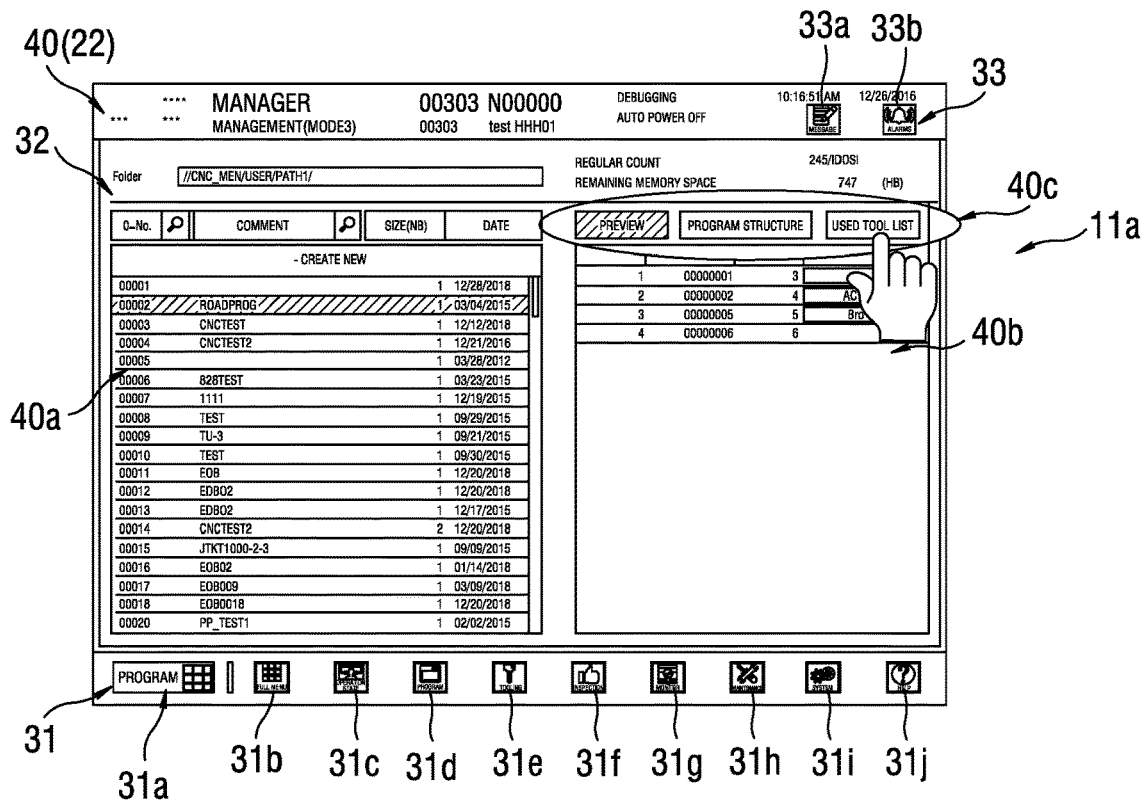
FIG. 7C is a display screen displayed on the display section when input operation is performed on a tool-in-use list button shown in FIGS. 7A and 7B.

In FIG. 7A, when input operation is performed on a "program configuration" button in the detailed information selection button 40c, a display screen shown in FIG. 7B is displayed on the display section 11a. In the detailed information region 40b shown in FIG. 7B, a configuration diagram of the computer program of the selected target is displayed. In FIGS. 7A and 7B, when input operation is performed on a "tool-in-use list" button in the detailed information selection button 40c, a display screen shown in FIG. 7C is displayed on the display section 11a. A tool list used for the computer program of the selected target is displayed in the detailed information region 40b shown in FIG. 7C.

Figure 8:
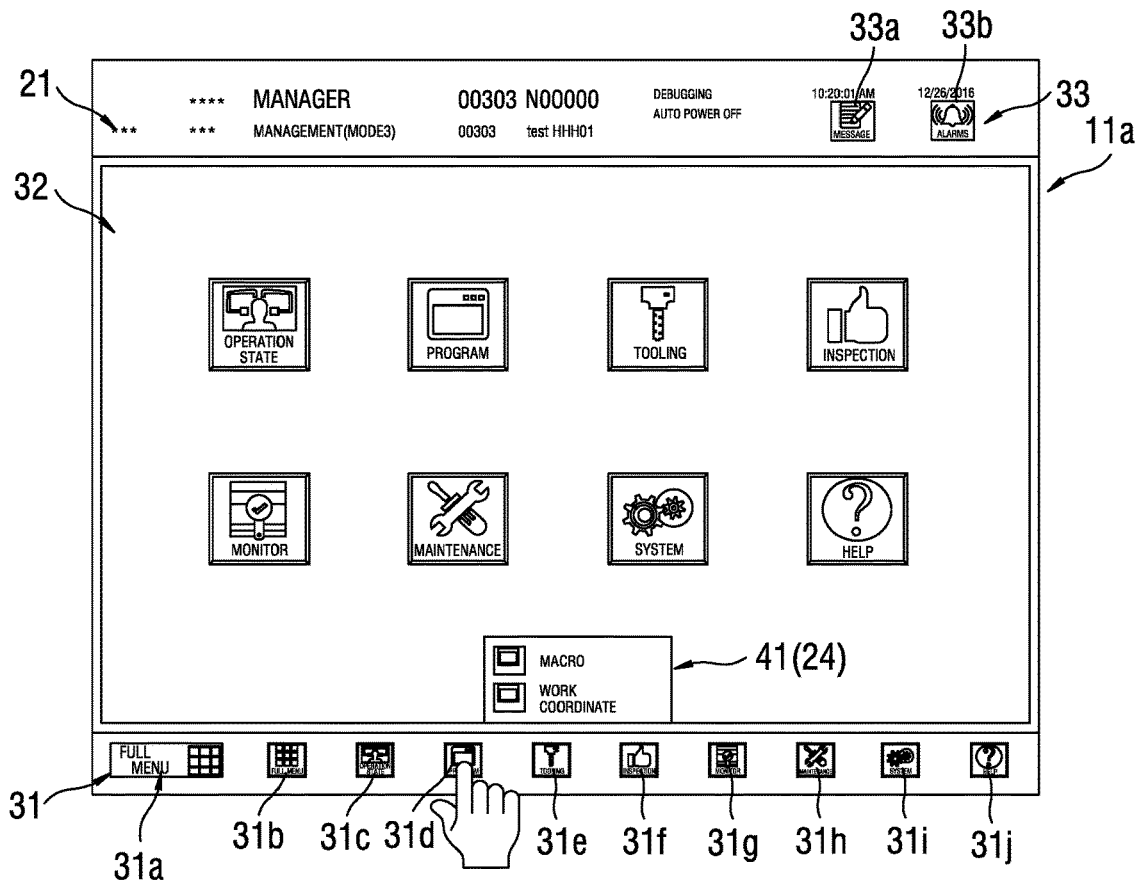
FIG. 8 is a display screen displayed on the display section when a second input (a long-press input) is performed on the program list button shown in FIG. 4.

On the other hand, when the long-press input to the main screen corresponding button 31d corresponding to the program list screen data 40 (22) in the constant display region 31 is performed (S6 in FIG. 5) when any one of the screen data 21, 22, and 23 (and 24) is displayed on the display section 11a, in the variable display region 32 of the display section 11a, list display data 41 (24) of the group G2 is displayed to be superimposed on the near side. In FIG. 8, a display screen displayed when the operation is performed in a state in which the menu screen data 21 is displayed on the display section 11a is shown. Specifically, in the display section 11a, the list display data 41 (24) of the group G2 is displayed to be superimposed on the near side in the vicinity of the main screen corresponding button 31d corresponding to the program list screen data 40 (22). The list display data 41 (24) includes a macro and a work coordinate. Therefore, when the operator performs input operation (selection operation) on the macro or the work coordinate, the sub-screen data 23 (details are not shown in the figure) corresponding to the macro or the work coordinate, on which the input operation (the selection operation) is performed, is displayed on the display section 11a.

(9. Tool Information Screen (the Group G3))

Display screens displayed on the display section 11a when the control section 12 receives an input to the main screen corresponding button 31e related to the tool list of the group G3 among the main screen corresponding buttons 31c to 31j of the constant display region 31 of the screen data 21, 22, and 23 are explained with reference to FIGS. 9 to 11.

Figure 9:
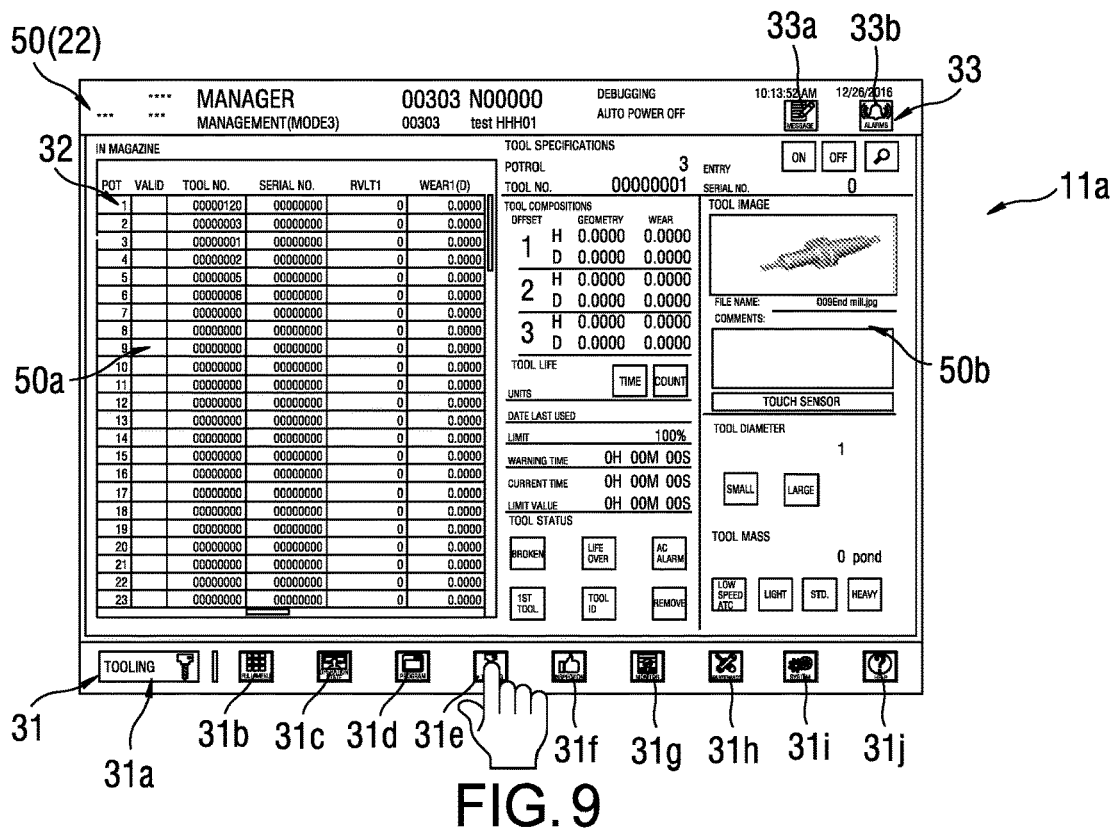
FIG. 9 is a display screen displayed on the display section when the first input (the short-press input) is performed on a tool list button shown in FIG. 4.
Figure 10:
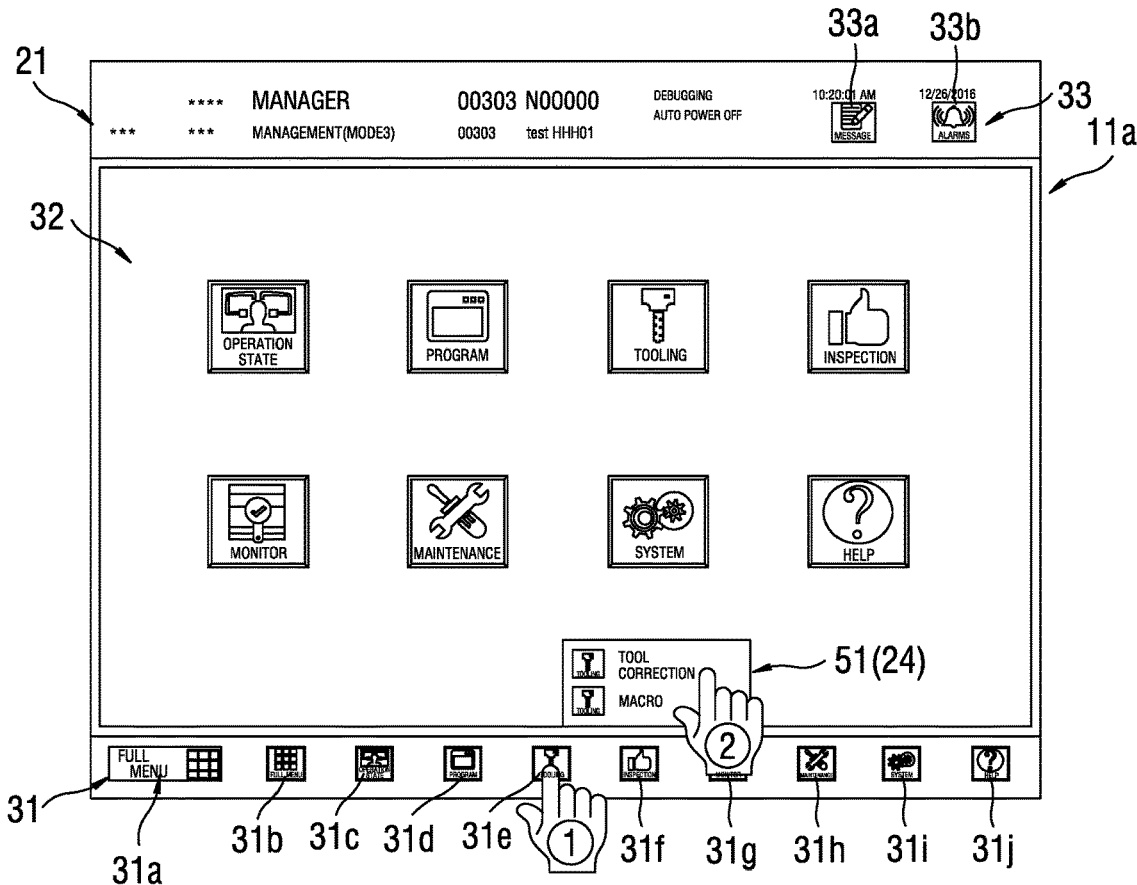
FIG. 10 is a display screen displayed on the display section when the second input (the long-press input) is performed on the tool list button shown in FIG. 4.

When the short-press input to the main screen corresponding button 31e corresponding to tool list screen data 50 (22) in the constant display region 31 is performed (S5 in FIG. 5) when any one of the screen data 21, 22, and 23 (and 24) is displayed on the display section 11a, a display screen shown in FIG. 9 is displayed on the display section 11a. When the short-press input to the second main screen corresponding button 21c corresponding to the tool list screen data 50 (22) is performed (S12 in FIG. 6) when menu screen data 21 shown in FIG. 4 is displayed on the display section 11a, the display screen shown in FIG. 9 is also displayed.

The tool list screen data 50 (22) includes the constant display region 31 in a lower part, the variable display region 32 in most of a region in the center, and the second constant display region 33 in an upper part. The contents explained concerning the overviews of the screen data are displayed in the constant display region 31 and the second constant display region 33.

The variable display region 32 of the tool list screen data 50 (22) includes a list region 50a on the left side and includes a detailed information region 50b on the right side. Display targets of the list region 50a are tools (information sources) stored in the CNC device 2, the PLC 4, or the like. A name list of the tools is displayed in the list region 50a. In the detailed information region 50b, detailed information related to a selected target selected out of the name list displayed in the list region 50a is displayed.

On the other hand, when the long-press input to the main screen corresponding button 31e corresponding to the tool list screen data 50 (22) in the constant display region 31 is performed (S6 in FIG. 5) when any one of the screen data 21, 22, and 23 (and 24) is displayed on the display section 11a, in the variable display region 32 of the display section 11a, the list display data 51 (24) of the group G3 is displayed to be superimposed on the near side. In FIG. 10, a display screen displayed when the operation is performed in a state in which the menu screen data 21 is displayed on the display section 11a is shown. Specifically, in the display section 11a, the list display data 51 (24) of the group G3 is displayed to be superimposed on the near side in the vicinity of the main screen corresponding button 31e corresponding to the tool list screen data 50 (22). The list display data 51 (24) includes tool correction and a macro.

Figure 11:
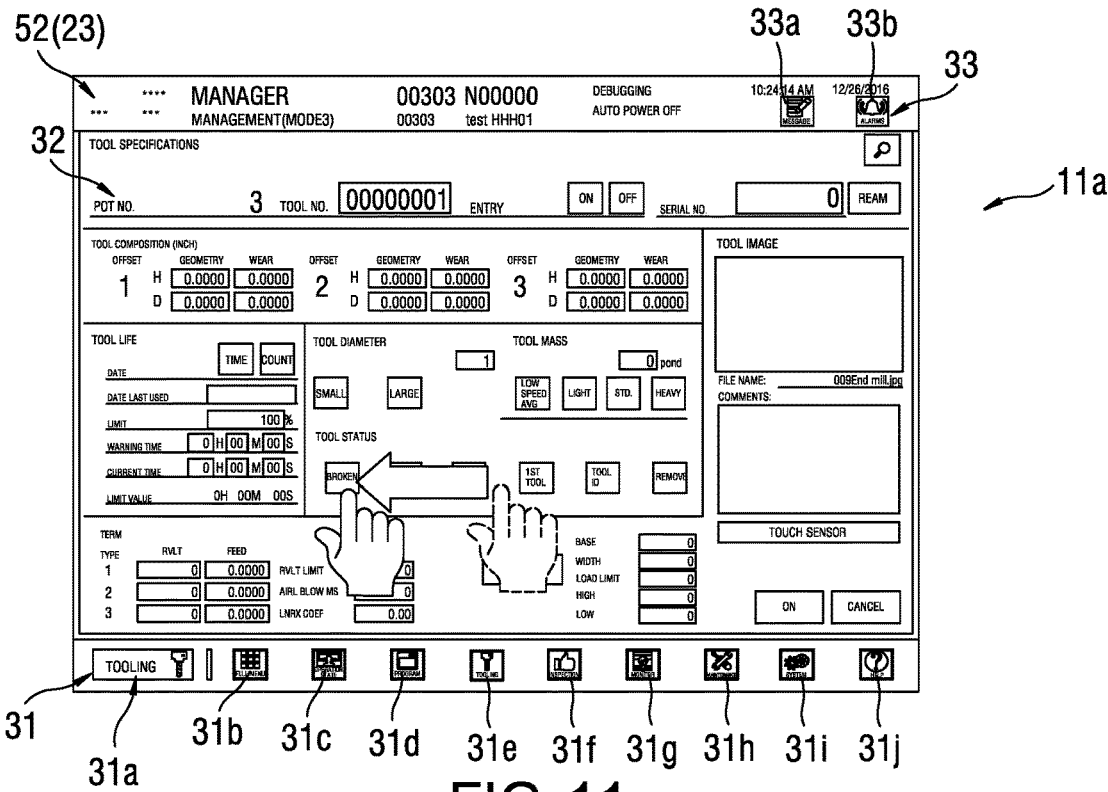
FIG. 11 is a display screen displayed on the display section when input operation is performed on tool list screen data shown in FIG. 9 and when input operation (selection operation) is performed on tool correction in list display data of sub-screen data shown in FIG. 10.

When the operator performs input operation (selection operation) on the tool correction, sub-screen data 52 (23) including detailed information concerning one kind of tool correction shown in FIG. 11 is displayed on the display section 11a. The sub-screen data 52 (23) is referred to as single screen data because the sub-screen data 52 (23) is screen data for displaying detailed information concerning one information source among a plurality of information sources. That is, the single screen data displayed on the display section 11a includes detailed information (one information source) concerning the one kind of tool correction among detailed information (a plurality of information sources) concerning a plurality of kinds of tool correction.

The sub-screen data (the single screen data) 52 (23) including the detailed information concerning the tool correction shown in FIG. 11 is also displayed when input operation (a touch input) is performed on the detailed information region 50b of the tool list screen data 50 (22) shown in FIG. 9. That is, the display screen of the display section 11a moves from the tool list screen data 50 (22) to the sub-screen data (the single screen data) 52 (23) including the detailed information concerning the tool correction.

When the sub-screen data (the single screen data) 52 (23) including the detailed information concerning the tool correction shown in FIG. 11 is displayed on the display section 11a, the control section 12 switches, according to slide operation by the operator, detailed information concerning a tool currently displayed to detailed information concerning a different tool (a tool registered next).

When the display device 11 is a touch panel, the slide operation is equivalent to swipe operation in which the operator touches a screen and slides a fingertip of the operator sideways and lengthways. As other kinds of slide operation, slide operation by a mouse of another personal computer and slide operation by a wearable input operation device may be adopted. For example, a device worn on a finger or the like and a device worn like eyeglasses can be applied to the wearable input operation device.

(10. Monitor Screen: Operation Result Screen (the Group G5))

Figure 12:
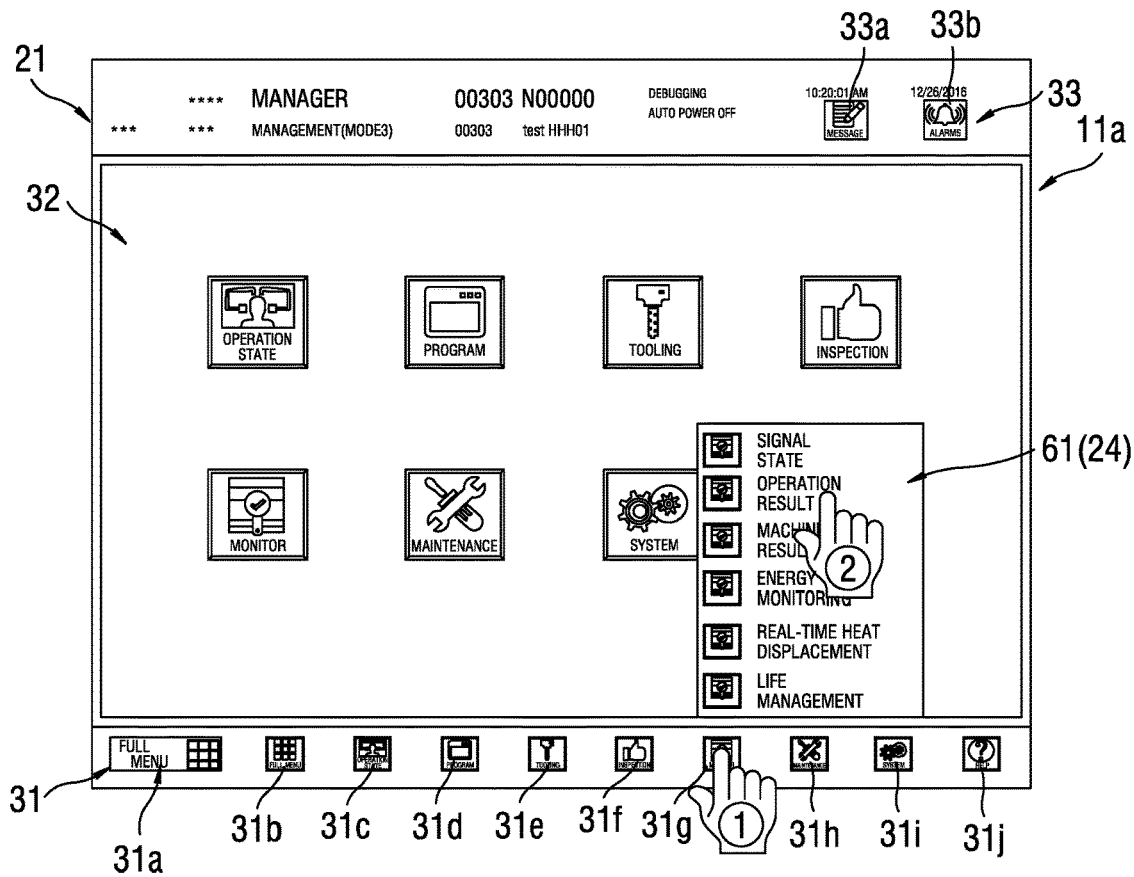
FIG. 12 is a display screen displayed on the display section when the second input (the long-press input) is performed on a monitor button shown in FIG. 4.
Figure 13:
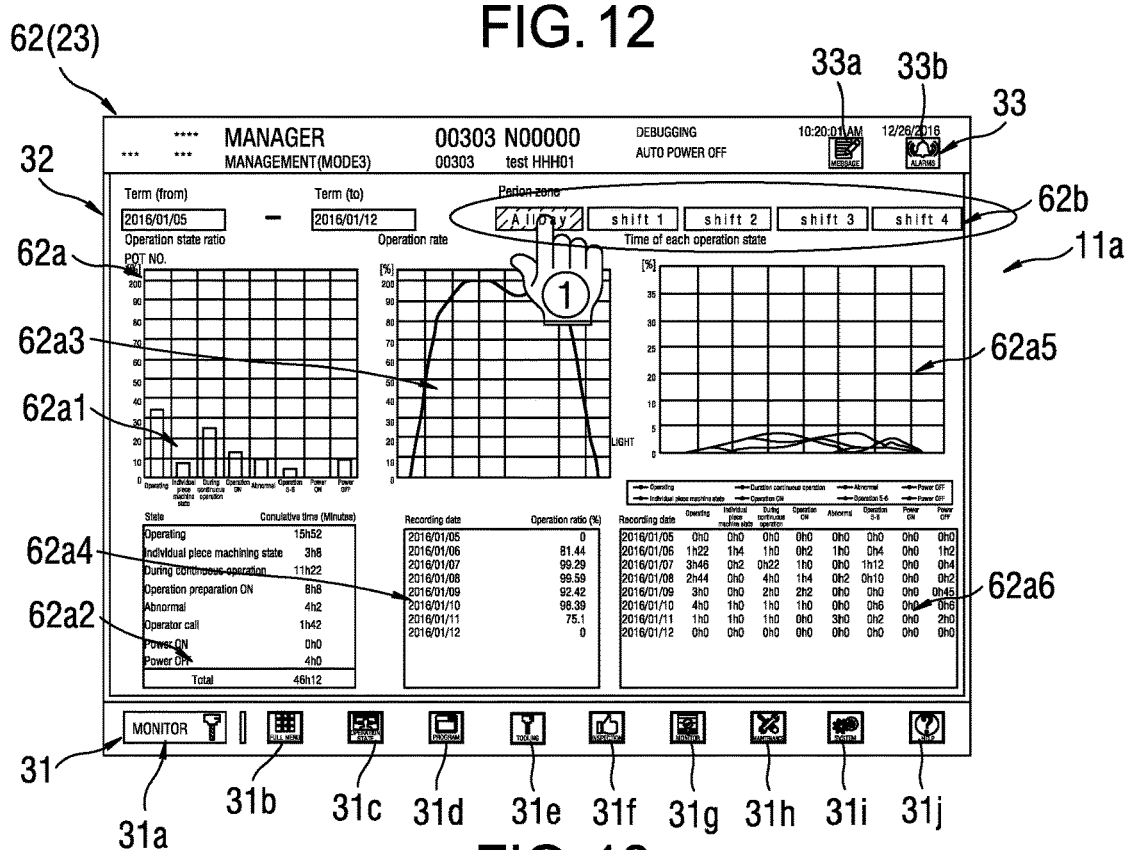
FIG. 13 is a display screen displayed on the display section when input operation is performed on an operation result button shown in FIG. 12.

Display screens displayed on the display section 11a when the control section 12 receives an input to the main screen corresponding button 31g related to the monitor of the group G5 among the main screen corresponding buttons 31c to 31j of the constant display region 31 of the screen data 21, 22, and 23 are explained with reference to FIGS. 12 and 13.

When the short-press input to the main screen corresponding button 31g corresponding to the monitor screen data in the constant display region 31 is performed (S5 in FIG. 5) when any one of the screen data 21, 22, and 23 (and 24) is displayed on the display section 11a, a display screen (not shown in the figure) including a part of information having a high monitoring frequency is displayed on the display section 11a. When the short-press input to the second main screen corresponding button 21e corresponding to the monitor screen data is performed (S12 in FIG. 6) when the menu screen data 21 shown in FIG. 4 is displayed on the display section 11a, the display screen (not shown in the figure) is also displayed.

On the other hand, when the long-press input to the main screen corresponding button 31g corresponding to the monitor screen data in the constant display region 31 is performed (S6 in FIG. 5) when any one of the screen data 21, 22, and 23 (and 24) is displayed on the display section 11a, in the variable display region 32 of the display section 11a, list display data 61 (24) of the group G5 is displayed to be superimposed on the near side. In FIG. 12, a display screen displayed when the operation is performed in a state in which the menu screen data is displayed on the display section 11a is shown. Specifically, in the display section 11a, the list display data 61 (24) of the group G5 is displayed to be superimposed on the near side in the vicinity of the main screen corresponding button 31g corresponding to the monitor screen data. The list display data 61 (24) includes a signal state, an operation result, a machining result, energy monitoring, real-time heat displacement, and life management. When the operator performs input operation (selection operation) on the operation result (the long-press input of (1) and the short-press input of (2) in FIG. 12), sub-screen data 62 (23) concerning the operation result shown in FIG. 13 is displayed.

The variable display region 32 of the sub-screen data (operation result screen data) 62 (23) concerning the operation result includes an operation result display region 62a where operation result data is displayed and a plurality of work shift type buttons 62b. The operation result display region 62a includes a graph display region 62a1 and a numerical value display region 62a2 concerning an operation state ratio, a graph display region 62a3 and a numerical value display region 62a4 concerning an operation ratio, and a graph display region 62a5 and a numerical value display region 62a6 concerning time for each operation state. The work shift type button 62b is a button including all work shifts, a button of a day work shift, a button of a night work shift, or the like.

The operation state ratio is a ratio of a cumulative time of an operating state, a ratio of a cumulative time of an individual piece machining state, a ratio of a cumulative time of an operation preparation ON state, a ratio of a cumulative time of an abnormal state, and the like. The operation ratio is an operation ratio (%) for each recording day. The time for each operation state is time in an operating state in every recording day, time of the individual piece machining state, time of an operation preparation ON state, time of an abnormal state, and the like.

When the operation result screen data 62 (23) is displayed on the display section 11a and when receiving an input (selection) to the plurality of work shift type buttons 62b, the control section 12 switches display content of the operation result display region 62a to operation result data related to a work shift corresponding to a (selected) work shift type on which the input is received and displays the operation result data.

(11. Abnormal Time Screen)

Figure 14:
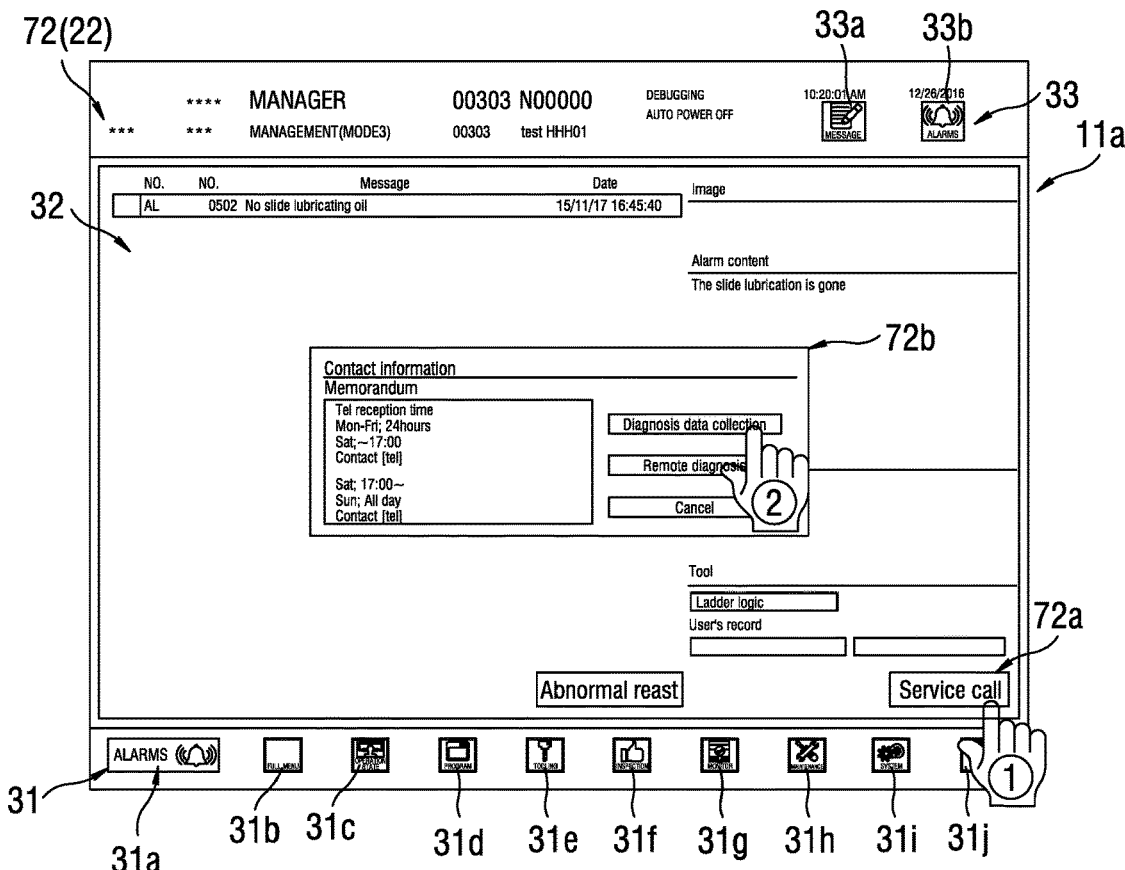
FIG. 14 is a display screen displayed on the display section when abnormality of a machine tool occurs.
Figure 15:
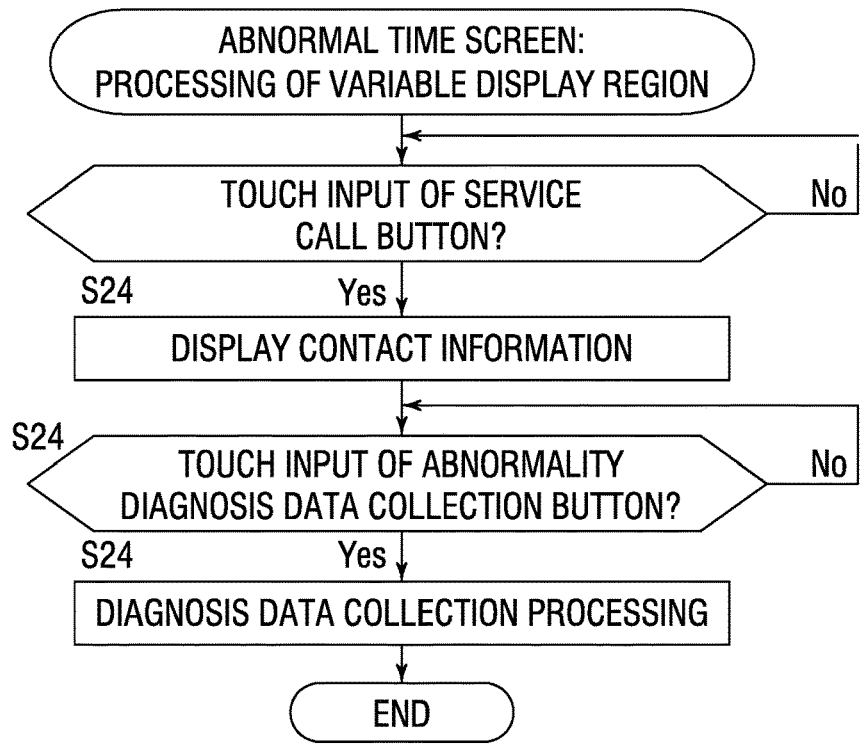
FIG. 15 is a flowchart for explaining processing of the control section shown in FIG. 1, the processing being performed on a variable display region of an abnormal time screen shown in FIG. 14.

During abnormality of the machine tool 1, abnormal time screen data 72 (22) shown in FIG. 14 is displayed on the display section 11a. The abnormal time screen data 72 (22) includes a service call button 72a on the lower right. Although not described in the main screen data 22 shown in FIG. 3, the abnormal time screen data 72 (22) is data similar to the other main screen data 22. When the abnormal time screen data 72 (22) is displayed on the display section 11a, the abnormal time screen data 72 (22) is displayed to be superimposed on a screen displayed earlier (superimposed on the near side as shown in FIG. 14). Processing of the control section 12 performed when the abnormal time screen data 72 (22) is displayed on the display section 11a is explained with reference to FIGS. 14 and 15.

When the operator performs an input to the service call button 72a (Yes in S21) when the abnormal time screen data 72 (22) is displayed on the display section 11a, a screen concerning contact information including a screen shown in the center of FIG. 14 is displayed (S22). Contact information for a service call is described on the screen of the contact information. The screen includes an abnormality diagnosis data collection button and a remote diagnosis button.

When input operation on the abnormality diagnosis data collection button is performed by the operator (Yes in S23), the control section 12 performs automatic collection of abnormality diagnosis data (S24). The control section 12 stores the automatically collected abnormality diagnosis data in the abnormality-diagnosis-data storing section 15. The operator records the automatically collected abnormality diagnosis data in an external medium and transmits the abnormality diagnosis data to the service call contact. The operator or the control section 12 may transmit the abnormality diagnosis data to an external server or an analysis system through a network (a LAN) connected to the control panel 6 or the like.

The short-press input and the long-press input are described as the first input and the second input. However, the first input and the second input may be operation of a tap and operation of a long tap performed in a so-called smartphone and the like. The first input and the second input can also be performed by a double tap, a flick, a swipe, a pinch, a multi tap, or a pointing device (pointer display on a screen) used in a personal computer. Remote operation by wireless or wired communication may be performed by the smartphone. The short-press input, the long-press input, and the like may be performed by a wearable input operation device. Naturally, inputs by other kinds of operation are also possible. In the above explanation, the input section 11b is included in the display device 11 functioning as the touch panel. However, the input section 11b can also be provided in a position other than the touch panel.

(12. Routine Inspection Screen (the Group G4))

Figure 18:
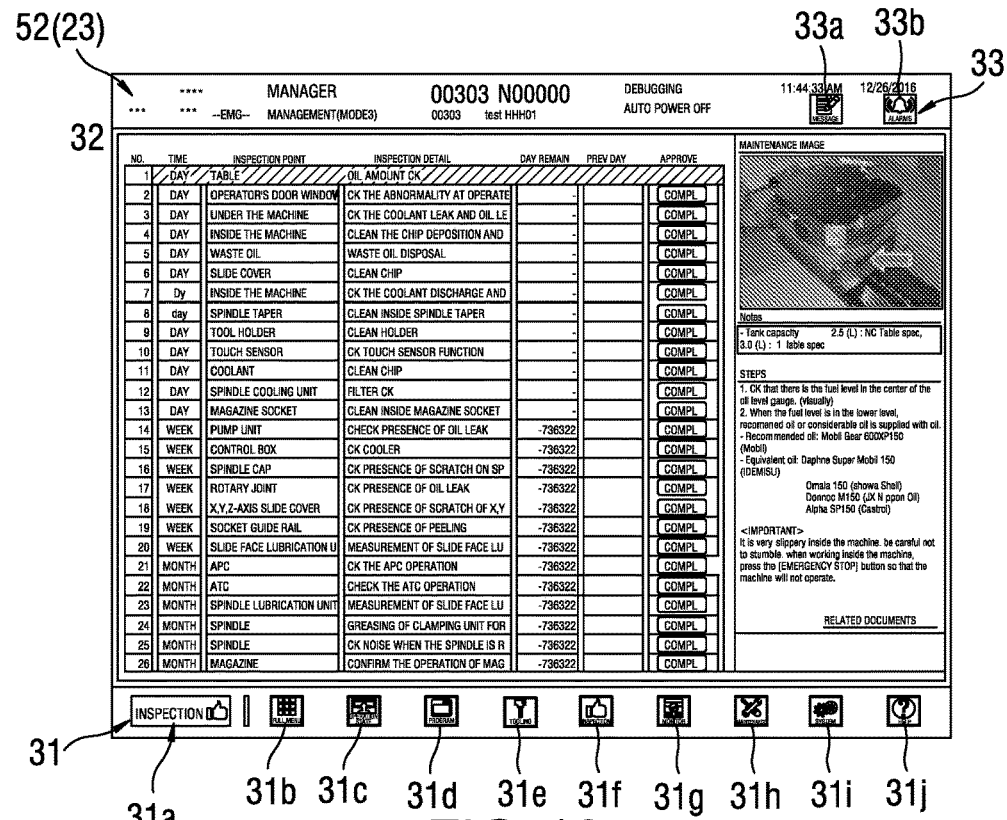
FIG. 18 is another display screen displayed on the display section when the short-press input is performed on the routine inspection button of the menu screen data.

Display screens displayed on the display section 11a when the control section 12 receives an input to the main screen corresponding button 31e related to the routine inspection screen of the group G4 among the main screen corresponding buttons 31c to 31j of the constant display region 31 of the screen data 21, 22, and 23 are explained with reference to FIGS. 16 to 18.

Figure 5:
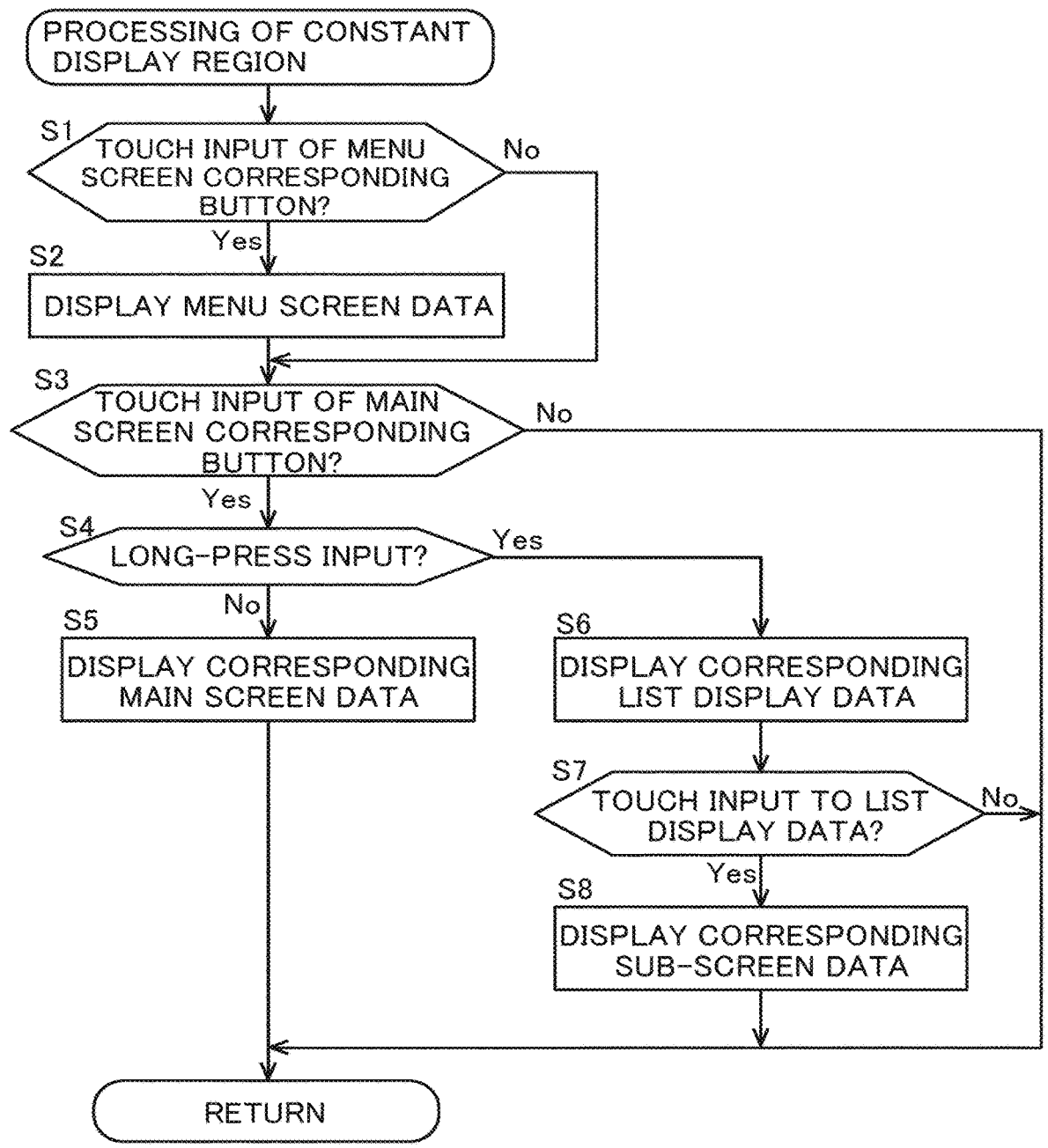
FIG. 5 is a flowchart for explaining processing of a control section shown in FIG. 1, the processing being performed on a constant display region in screen data.
Figures 16, 17:
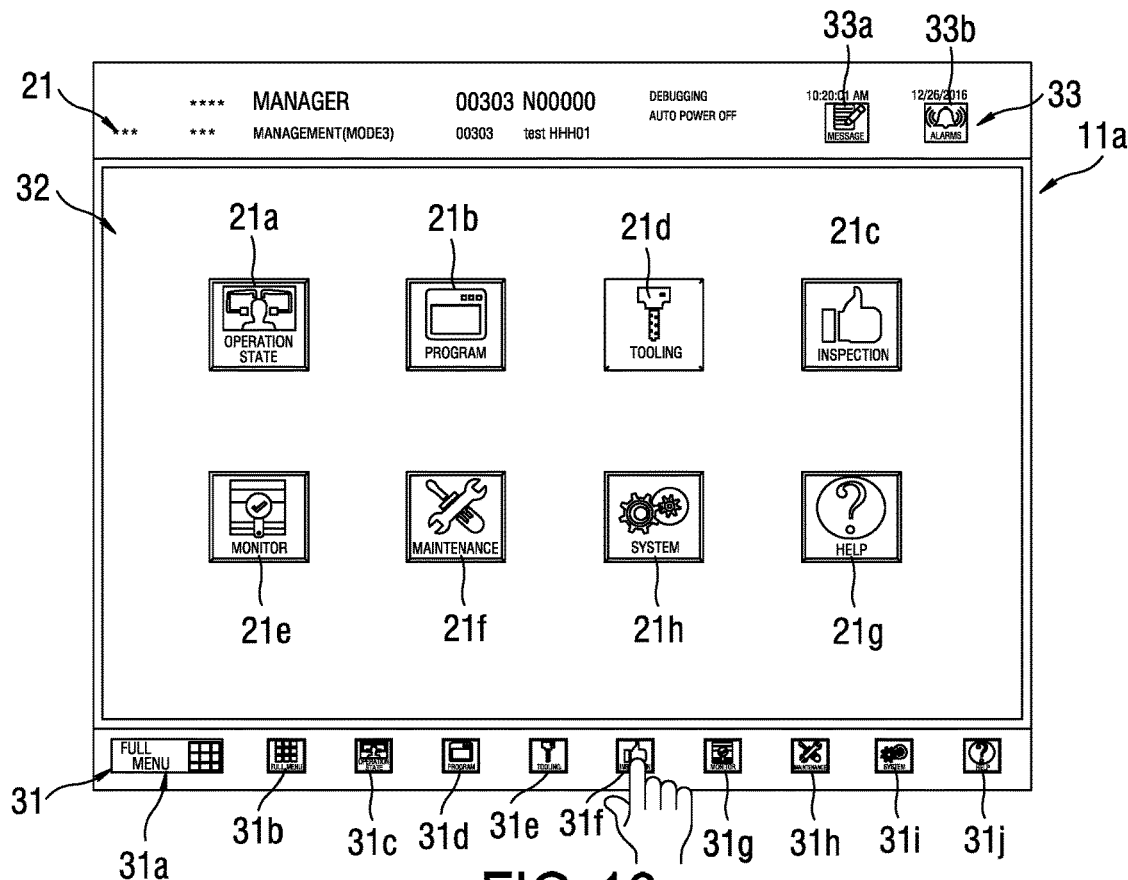
FIG. 16 is a display screen displayed on the display section in a state in which the short-press input is performed on a routine inspection button of the menu screen data.
FIG. 17 is a display screen displayed on the display section when the short-press input is performed on the routine inspection button of the menu screen data.

As shown in FIG. 16, it is assumed that, when any one of the screen data 21, 22, and 23 (and 24) is displayed on the display section 11a, the short-press input to the main screen corresponding button 31e corresponding to routine inspection screen data 80 (22) in the constant display region 31 is performed (S5 in FIG. 5). In this case, a display screen shown in FIG. 17 or 18 is displayed on the display section 11a.

The routine inspection screen data 80 (22) is screen data for displaying routine inspection information of maintenance target objects. The routine inspection screen data 80 (22) includes the constant display region 31 in a lower part, the variable display region 32 in most of a region in the center, and the second constant display region 33 in an upper part. The contents explained concerning the overviews of the screen data are displayed in the constant display region 31 and the second constant display region 33. The variable display region 32 of the routine inspection screen data 80 (22) includes a list region 80a on the left side and includes, on the right side, a detailed information region 80b where inspection detailed information is displayed.

The list region 80a includes an inspection period, an inspection target, and inspection content stored in the management-information storing section 16 and includes the last inspection date stored in the present-state-information storing section 17. In a field of the inspection period, a period from the last inspection to the next inspection (a use period) such as one month, sixth months, or one year is displayed. In a field of the inspection target, maintenance target objects of the routine inspection such as a control panel, a pump unit, and a spindle device are displayed. In a field of the inspection content, a one-word point of the inspection is displayed. Further, the list region 80a includes, in the items, an inspection completion button 80a1 for receiving an input.

In the detailed information region 80b, detailed information related to a selected target selected out of the list displayed in the list region 80a is displayed. In the detailed information region 80b, information such as a maintenance procedure stored in the management-information storing section 16 is displayed. In the detailed information region 80b shown in FIG. 17, for example, a maintenance procedure in the case of a maintenance target object for which measurement is necessary as the routine inspection is displayed. In the detailed information region 80b shown in FIG. 18, a maintenance procedure in the case of a maintenance target object for which inspection is necessary as the routine inspection is displayed.

When the inspection period approaches, the control section 12 causes the display section 11a to display a message (not shown). The operator causes the display section 11a to display the routine inspection screen data 80 (22) according to the operation method explained above and carries out measurement or inspection of inspection targets. Thereafter, the operator performs input operation on the inspection completion button 80a1 of an item corresponding to routine inspection screen data 80 (22). According to the operation, when receiving an input to the inspection completion button 80a1, the control section 12 resets, in the present-state-information storing section 17, a use period concerning a maintenance target object corresponding to the inspection completion button 80a1. That is, when an input of inspection completion serving as present state information is performed, the control section 12 stores the input present state information in the present-state-information storing section 17.

When the routine inspection screen data 80 (22) is displayed on the display section 11a, the operator can perform setting of management information according to input operation by the input section 11b. In this case, the control section stores the set management information in the management-information storing section 16. That is, the operator can add a new inspection target. Further, the operator can edit an already-set inspection target and related information of the inspection target.

(13. Monitor Screen: Life Management Screen (the Group G5))

Figure 19:
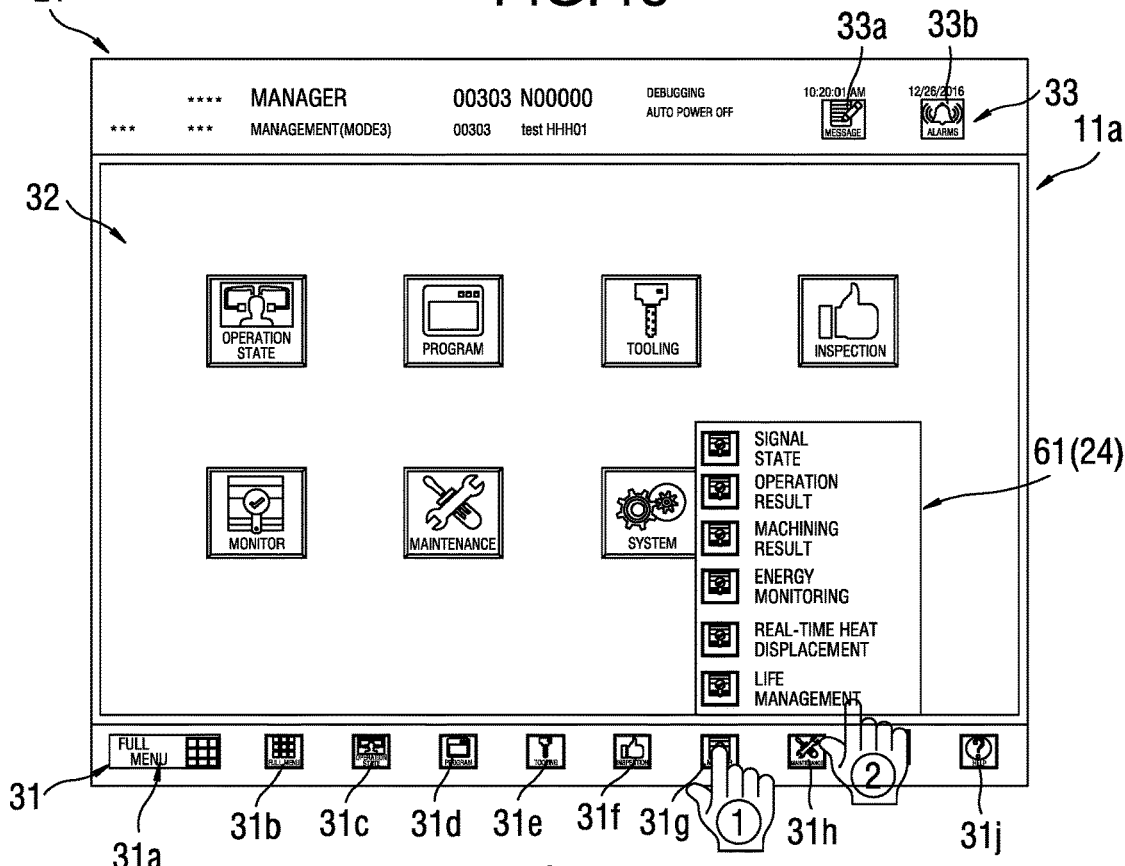
FIG. 19 is a display screen displayed on the display section when the long-press input is performed on the monitor button of the menu screen data.

Display screens displayed on the display section 11a when the control section 12 receives an input to the main screen corresponding button 31f related to the monitor screen of the group G5 among the main screen corresponding buttons 31c to 31j of the constant display region 31 of the screen data 21, 22, and 23 are explained with reference to FIGS. 19 and 20.

It is assumed that, when any one of the screen data 21, 22, and 23 (and 24) is displayed on the display section 11a, the long-press input to the main screen corresponding button 31f corresponding to the monitor screen data in the constant display region 31 is performed (S6 in FIG. 5). In this case, in the variable display region 32 of the display section 11a, the list display data 61 (24) of the group G5 is displayed to be superimposed on the near side. In FIG. 19, a display screen displayed when the operation is performed in a state in which the menu screen data 21 is displayed on the display section 11a is shown. Specifically, in the display section 11a, the list display data 61 (24) of the group G5 is displayed to be superimposed on the near side in the vicinity of the main screen corresponding button 31f corresponding to the monitor screen data.

Figure 20:
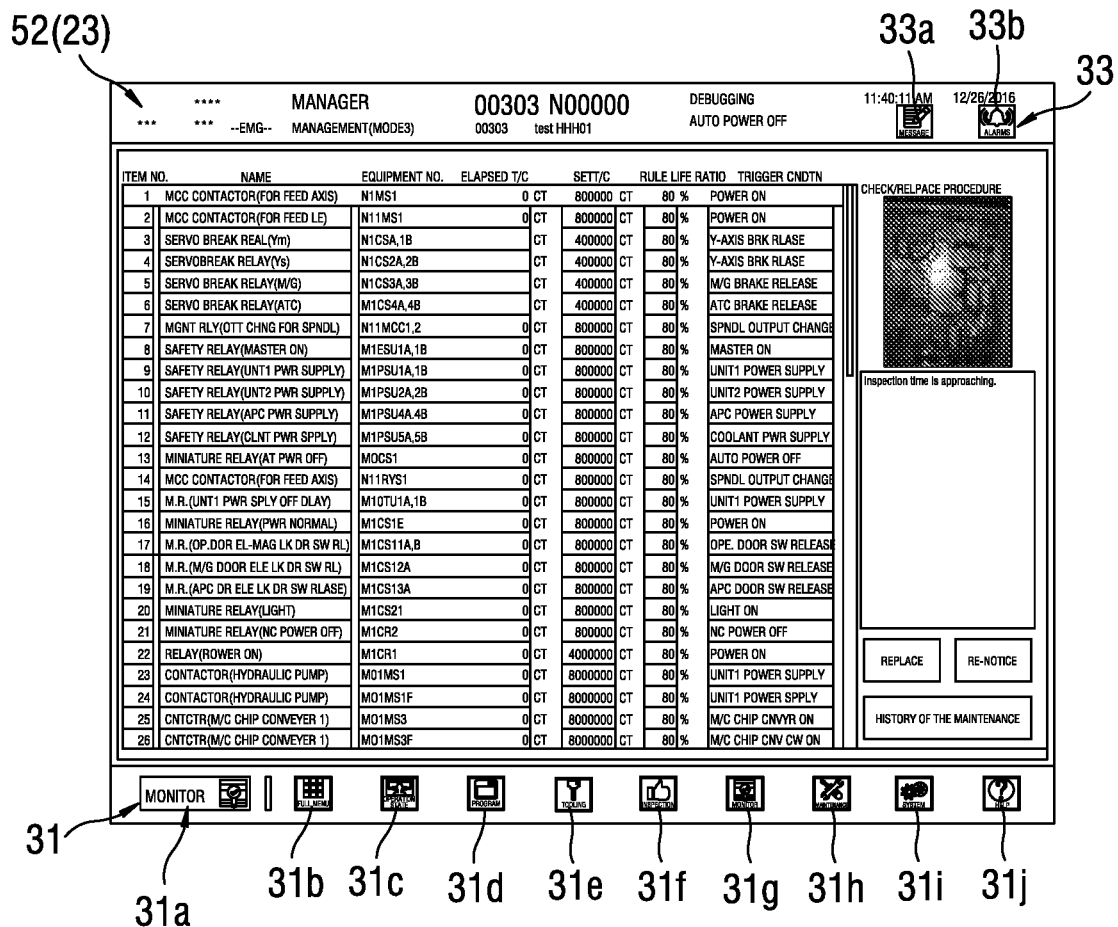
FIG. 20 is a display screen displayed on the display section when input operation (selection operation) for life management in list display data shown in FIG. 19 is performed.

When the operator performs input operation (selection operation) on the life management in the list display data 61 (24), as shown in FIG. 20, life management screen data 63 (23) is displayed on the display section 11a as the sub-screen data 23 corresponding to the life management on which the input operation (the selection operation) is performed.

The life management screen data 63 (23) is screen data for life management of maintenance target objects. The life management screen data 63 (23) includes the constant display region 31 in a lower part, the variable display region 32 in most of a region in the center, and the second constant display region 33 in an upper part. The contents explained concerning the overviews of the screen data are displayed in the constant display region 31 and the second constant display region 33. The variable display region 32 of the life management screen data 63 (23) includes a list region 63a on the left side and includes, on the right side, a detailed information region 63b where an inspection/replacement procedure is displayed.

The list region 63a includes an apparatus name, an apparatus number, a life value, a specified life ratio, and a count-up condition (a trigger condition) of an apparatus that is a target of the life management stored in the management-information storing section 16. The life value is a count value corresponding to the apparatus that is the target of the life management. The specified life ratio is a ratio corresponding to the life value for performing notification. An initial value of the specified life ratio is set to, for example, 80%. The count-up condition is set for each target of the life management. The count-up condition is, for example, power-on.

Further, the list region 63a includes a present count value stored in the present-state-information storing section 17. The present count value is a count value counted up every time the count-up condition is satisfied after the apparatus is replaced. The present count value is equivalent to a use frequency of the apparatus.

In the detailed information region 63b, detailed information related to a selected target selected out of a list displayed in the list region 63a is displayed. In the detailed information region 63b, an inspection/replacement procedure stored in the management-information storing section 16 is displayed.

The life management screen data 63 (23) includes a replacement button 63c, a re-notification button 63d, and a replacement history button 63e. The replacement button 63c is a button operated to be input by the operator when replacement of a target apparatus of the life management ends. The re-notification button 63d is a button for re-notifying that a replacement period is temporarily extended and life ends after notifying that the life ends. The replacement history button 63e is a button for displaying replacement history information in the past stored in the replacement-history-information storing section 18.

When the count value reaches a value obtained by multiplying the life value with the specified life ratio, the control section 12 notifies the display section 11a that the life of a relevant apparatus ends (sends a message to that effect). The operator causes the display section 11a to display the life management screen data 63 (23) according to the operation method and carries out inspection/replacement of the apparatus. When the replacement of the apparatus is completed, the operator performs input operation to the replacement button 63c. According to the operation, when receiving an input to the replacement button 63c, the control section 12 resets a count value (a use frequency) concerning the apparatus in the present-state-information storing section 17. That is, when an input of replacement serving as present state information is performed, the control section stores the input present state information in the present-state-information storing section 17.

When it is notified that the life ends, the operator can immediately perform the replacement of the apparatus. However, as other means, the operator can temporarily put off the replacement by performing input operation to the re-notification button 63d. When receiving the input to the re-notification button 63d, for example, the control section 12 sets the specified life ratio to 90%. When the count value reaches a value obtained by multiplying the life value with the specified life ratio (90%), the control section 12 re-notifies the display section 11a that the life of the apparatus ends (sends a message to that effect). When it is re-notified that the life ends, the operator performs the replacement of the apparatus and performs the processing explained above.

When the routine inspection screen data 80 (22) is displayed on the display section 11a, the operator can perform setting of management information according to input operation by the input section 11b. In this case, the control section stores the set management information in the management-information storing section 16. That is, the operator can add a new inspection target. Further, the operator can edit an already-set inspection target and related information of the inspection target.

In particular, most of ON/OFF states of a control program and a machining program (including a ladder program) are data with which inspection and management can be performed, that is, data with which an operation state can be grasped. Therefore, an apparatus, an ON/OFF state, time in which ON/OFF is continued, and the like of which can be acquired, and components of the apparatus can be set as inspection targets and life management targets.

When it is notified that the life ends, the operator can grasp a replacement history in the past by performing input operation on the replacement history button 63e. The operator can examine from the replacement history in the past whether the target apparatus should be immediately replaced or the replacement can be put off until the re-notification. That is, the operator can also perform input operation on the re-notification button 63d after checking the replacement history in the past.

When the life management screen data 63 (23) is displayed on the display section 11a, the operator can perform setting of management information according to input operation by the input section 11b. In this case, the control section 12 stores the set management information in the management-information storing section 16.

For example, the operator can add a new target of the life management. In this case, the operator sets an apparatus name, an apparatus number, a life value, a specified life ratio, and a count-up condition (a trigger condition) of an apparatus that is the target of the life management. The operator can also edit an already-set count-up condition (trigger condition). Further, the operator can also edit an already-set life value and an already-set specified life ratio.

The operator or the control section 12 may connect the machine tool 1 to an external server or an analysis system through a network (a LAN) connected to the control panel 6 and the like, transmit the management information (16), the present state information (17), and the replacement history information (18), and perform an analysis or an analytical study and may change the management information (16) and the like according to a result of the analysis.

(14. Monitor Screen: Signal State Screen (the Group G5))

Display screens displayed on the display section 11a when the control section 12 receives an input to the main screen corresponding button 31f related to the monitor screen of the group G5 among the main screen corresponding buttons 31c to 31j of the constant display region 31 of the screen data 21, 22, and 23 are explained with reference to FIGS. 21 to 26.

Figure 21:
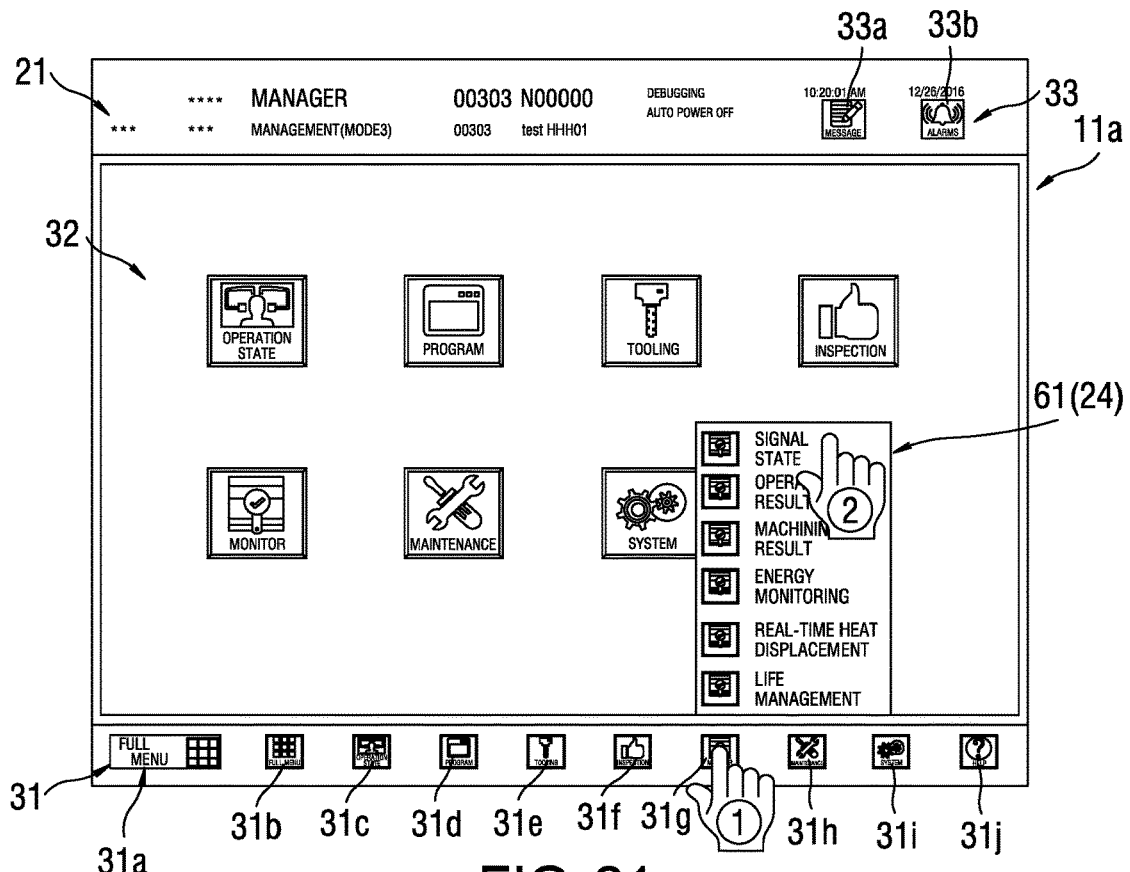
FIG. 21 is a display screen displayed on the display section when the long-press input is performed on the monitor button of the menu screen data.

It is assumed that, when any one of the screen data 21, 22, and 23 (and 24) is displayed on the display section 11a, the long-press input to the main screen corresponding button 31f corresponding to the monitor screen data in the constant display region 31 is performed (S6 in FIG. 5). In this case, the list display data 61 (24) of the group G5 is displayed to be superimposed on the near side in the variable display region 32 of the display section 11a. In FIG. 21, a display screen displayed when the operation is performed in a state in which the menu screen data 21 is displayed on the display section 11a is shown. Specifically, in the display section 11a, the list display data 61 (24) of the group G5 is displayed to be superimposed on the near side in the vicinity of the main screen corresponding button 31f corresponding to the monitor screen data.

Figure 22:
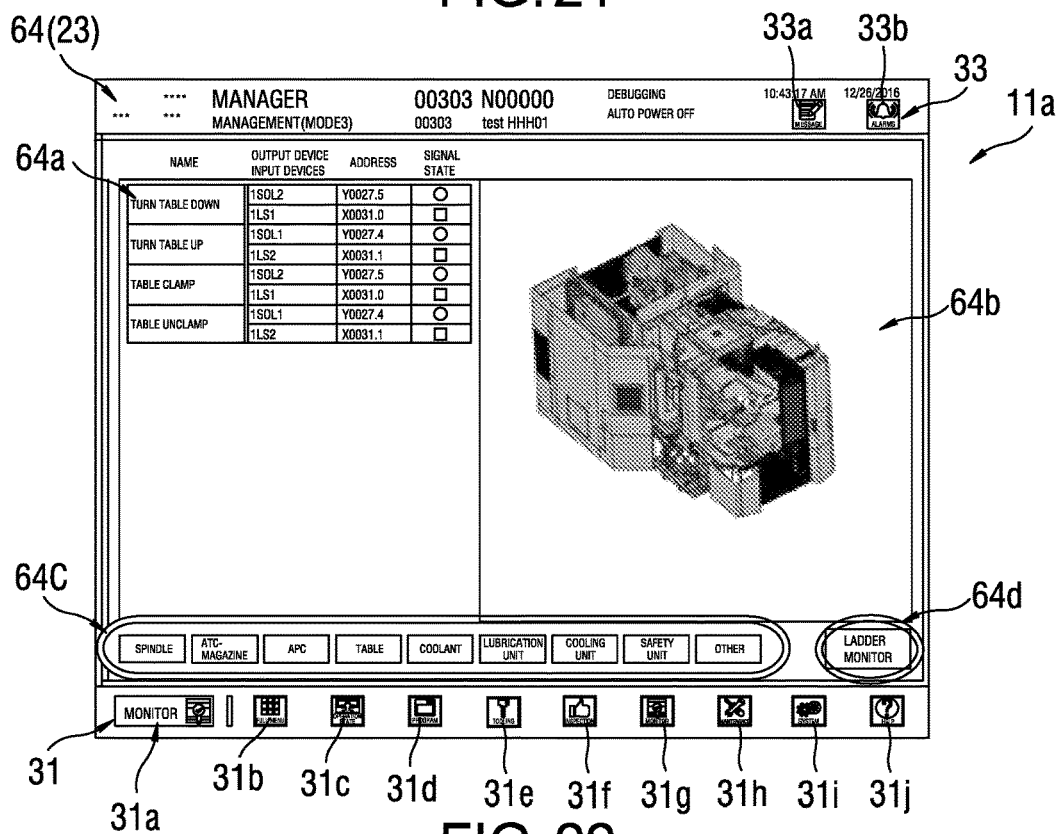
FIG. 22 is screen data for checking a signal state of a facility displayed when input operation (selection operation) for a signal state in list display data shown in FIG. 21 is performed.

When the operator performs input operation (selection operation) on the signal state in the list display data 61 (24), as shown in FIG. 22, signal state screen data 64 (23) serving as the sub-screen data 23 corresponding to the signal state, on which the input operation (the selection operation) is performed, is displayed on the display section 11a.

The signal state screen data 64 (23) is screen data for checking a signal state of an operation target object of the machine tool 1. The signal state screen data 64 (23) includes the constant display region 31 in a lower part, the variable display region 32 in most of a region in the center, and the second constant display region 33 in an upper part. The contents explained concerning the overviews of the screen data are displayed in the constant display region 31 and the second constant display region 33.

The operation target object is an apparatus that performs ON/OFF operation and is, in this embodiment, a target object that the PLC control section 4b controls on the basis of a sequence program (a ladder program) stored in the storing section 4a. For example, the operation target object is a swiveling table that moves up and down, a clamp apparatus that tightens and loosens the swiveling table, or the like.

The variable display region 32 of the signal state screen data 64 (23) includes, as shown in FIG. 22, a list region 64a where an ON/OFF actual operation state and ON/OFF operation command information concerning the operation target object are displayed and an image region 64b where an image of the operation target object is displayed. Further, the variable display region 32 of the signal state screen data 64 (23) includes a unit button 64c classified for each of units configuring the machine tool 1 and a program button 64d for displaying the sequence program.

In the list region 64a, lists shown in FIGS. 23 and 24 are displayed. The list region 64a includes a name, an apparatus sign, an address, and a signal state of the operation target object. In particular, two or more kinds of apparatus signs, addresses, signal states are present for each of operation target objects. Information in the upper part is ON/OFF operation command information for the operation target object output by the PLC control section 4b. Information in the lower part is an ON/OFF actual operation state of the operation target object detected by a sensor (not shown in the figure).

The ON/OFF operation command information and the ON/OFF actual operation state are stored in the storing section 4a of the PLC 4. That is, when the signal state screen data 64 (23) is displayed on the display section 11a, the control section 12 of the control panel 6 acquires information corresponding to the signal state screen data 64 (23) from the storing section 4a of the PLC 4 and displays the information on the display section 11a. As the signal state, the ON/OFF operation command information is indicated by a circle and the ON/OFF actual operation state is indicated by a square. Further, when the signal state is ON, the signal state in indicated by white. When the signal state is OFF, the signal state is indicated by black.

In the list region 64a shown in FIG. 23, a state at the time when all signal states are ON is displayed. On the other hand, in the list region 64a shown in FIG. 24, concerning an operation target object for swiveling table lowering, the ON/OFF operation command information is OFF and the ON/OFF actual operation state is ON.

At normal time, the ON/OFF operation command information and the ON/OFF actual operation state coincide with each other. This is because the operation target object performs ON/OFF actual operation on the basis of the ON/OFF operation command information. That is, the list region 64a shown in FIG. 23 indicates a state at the normal time. When the ON/OFF operation command information and the ON/OFF actual operation state do not coincide with each other, the operation target object is in an abnormal state. The list region 64a shown in FIG. 24 means that the operation target object for the swiveling table lowering is in the abnormal state. That is, although the PLC control section 4b outputs a command for setting the operation of the operation target object to off, the actual operation of the operation target object does not shift to the OFF state.

In the image region 64b, the image associated with the operation target objects displayed in the list region 64a among images stored in the image storing section 19 is displayed. In FIG. 22, a list related to a table is displayed in the list region 64a. Therefore, an image related to the table is displayed in the image region 64b. Further, in the image, marks are displayed together with signal states of ON/OFF in positions respectively corresponding to the operation target objects displayed in the list region 64a.

That is, by checking display contents shown in FIG. 22, the operator can grasp at an instance in which positions of the machine tool 1 the operation target objects concerning the table are present while grasping the signal states concerning the table.

A plurality of unit buttons 64c are present in a lower field of the variable display region 32 of the signal state screen data 64 (23). In FIG. 22, the table is selected and information concerning the table is displayed in the list region 64a and the image region 64b. When the operator performs input operation (selection operation) on any one of the unit buttons 64*c*, the control section 12 displays information corresponding to the unit button 64*c*, on which the input (selection) is received, in the list region 64*a* and the image region 64*b*.

Component units of the machine tool 1 are classified into a spindle, an automatic tool changer (ATC), a magazine, an automatic pallet changer (APC), a table, a coolant device, a circulating device, a cooling device, a safety device, and the like. The unit buttons 64*c* for the respective component units are displayed in the signal state screen data 64 (23).

Figure 25:
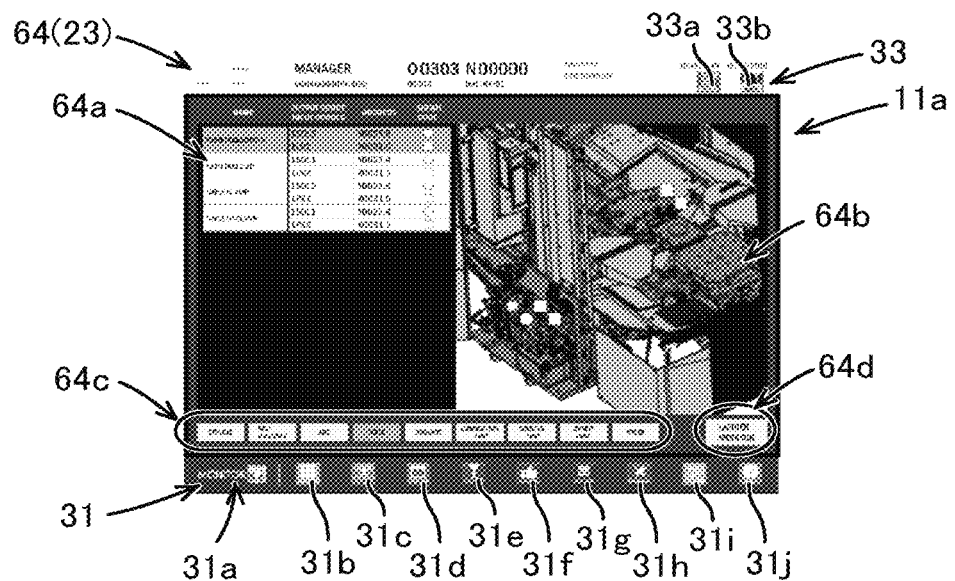
FIG. 25 is a diagram of a state in which an image region is enlarged and displayed in screen data shown in FIG. 22.

When the operator performs enlarging operation for the image region 64*b*, as shown in FIG. 25, the control section 12 performs enlargement of the image displayed in the image region 64*b*. Conversely, when the operator performs reducing operation for the image region 64*b*, the control section 12 performs reduction of the image displayed in the image region 64*b*.

In FIG. 25, as the enlarging operation and the reducing operation, operation for widening the interval between touching two fingers (pinch-out operation) and operation for narrowing the interval (pinch-in operation) in a smartphone or the like are used. However, a smartphone, a personal computer, a wearable input operation device, and the like on the outside can also be used.

Figure 26:
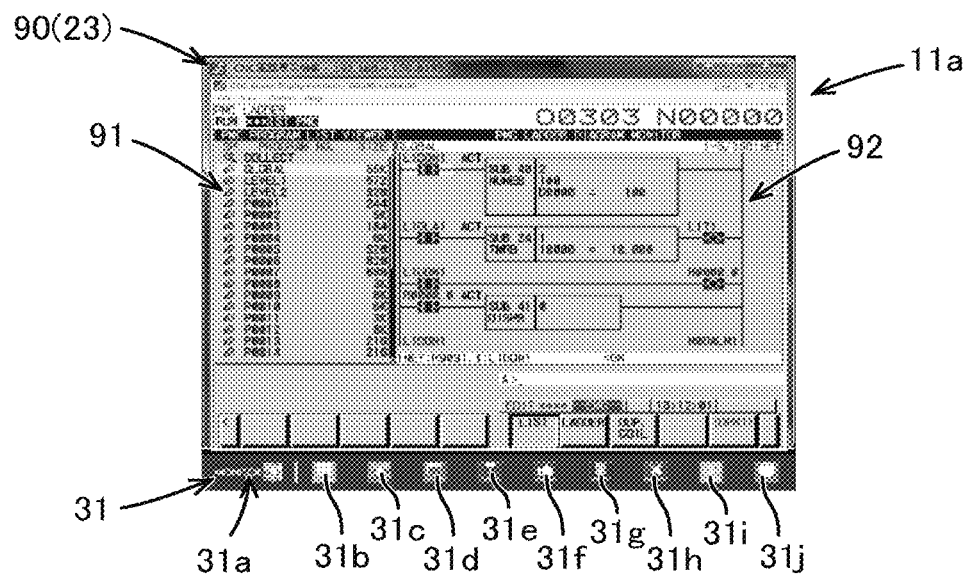
FIG. 26 is program screen data displayed when input operation is performed on a program button shown in FIG. 22.

Further, the program button 64*d* inscribed as ladder monitor is present on the lower right of the signal state screen data 64 (23). When the operator performs input operation (selection operation) on the program button 64*d*, program screen data 90 (23) shown in FIG. 26 is displayed on the display section 11*a*. The program screen data 90 (23) is stored in the screen-data storing section 13.

Specifically, when receiving an input of the program button 64*d*, the control section 12 switches the program screen data concerning the operation target object displayed in the list region 64*a* and displays the program screen data on the display section 11*a*. At this point, as shown in FIG. 26, the control section 12 performs ON/OFF display at input/output contacts. That is, when it is determined that the operation target object for the swiveling table lowering shown in FIG. 24 is abnormal, the operator can check states before and after a relevant part in the sequence program by performing input operation (selection operation) on the program button 64*d*.

The operator or the control section 12 may transmit the ON/OFF operation command information, the ON/OFF actual operation state information, and the like to the external server or the analysis system through the network (the LAN) connected to the control panel 6 and perform an analysis or an analytical study.

(15. Effect of the Control Panel for Machine Tools 6)

The control panel for machine tools 6 in the embodiment includes the screen-data storing section 13 configured to store the plurality of screen data 21, 22, and 23 (and 24) including the operation buttons and for displaying machine data of the machine tool 1, the display section 11*a* configured to display at least one of the plurality of screen data 21, 22, and 23 (and 24), the input section 11*b* configured to receive an input to the operations buttons of the screen data 21, 22, and 23 (and 24) displayed on the display section 11*a*, and the control section 12 configured to change, on the basis of the input to the operation buttons displayed on the display section 11*a*, the screen data 21, 22, and 23 (and 24) displayed on the display section 11*a*.

The plurality of screen data 21, 22, and 23 (and 24) are classified into the plurality of groups G1 to G10 and classified into the main screen data 22 and the sub-screen data 23 associated with the main screen data 22 in each of the groups G1 to G10. The screen-data storing section 13 further stores the list display data 24 in which the sub-screen data 23 in the groups G1 to G10 are displayed as a list. All of the plurality of screen data 21, 22, and 23 include, in the constant display region 31, as the operation buttons, the plurality of main screen corresponding buttons 31*c* to 31*j* associated with the respective main screen data 22.

Further, when receiving the short-press input (the first input) on one of the plurality of main screen corresponding buttons 31*c* to 31*j*, the control section 12 displays the main screen data 22 corresponding to the main screen corresponding button on the display section 11*a*. On the other hand, when receiving the long-press input (the second input) on one of the plurality of main screen corresponding buttons 31*c* to 31*j*, the control section 12 displays the list display data 24 of the sub-screen data 23 related to the main screen data 22 corresponding to the main screen corresponding button on the display section 11*a*. Further, when receiving input (selection) to the list display data 24, the control section 12 displays the sub-screen data 23 corresponding to the list display data 24 on the display section 11*a*.

That is, the plurality of screen data 21, 22, and 23 are grouped and classified into one main screen data 22 and one or the plurality of sub-screen data 23 in each of the groups G1 to G10. Further, the constant display region 31 is set in all of the screen data 21, 22, and 23. The main screen corresponding buttons 31*c* to 31*j* corresponding to the groups G1 to G10 are displayed in the constant display region 31. Therefore, the operator can easily grasp from the constant display region 31 that information included in a target group is displayed.

Further, display of the main screen data 22 and the list display of the sub-screen data 23 are distinguished according to an operation method on the main screen corresponding buttons 31*c* to 31*j* in the constant display region 31. Specifically, when the operator performs the short-press input (the first input) to one of the main screen corresponding buttons 31*c* to 31*j*, the main screen data 22 corresponding to the main screen corresponding button is displayed. On the other hand, when the operator performs the long-press input (the second input) on one of the main screen corresponding buttons 31*c* to 31*j*, the list display data 24 of the sub-screen data 23 is displayed. After the list display data 24 is displayed, if the operator performs input operation (selection operation) to any one of the lists, the sub-screen data 23 corresponding to the list is displayed. In this way, irrespective of which screen data is displayed, it is extremely easy for the operator to grasp operation for displaying target screen data.

In particular, the grouped screen data are classified into the main screen data 22 and the sub-screen data 23. Therefore, it is possible to easily display the main screen data 22 simply by performing the short-press input (the first input) on the main screen corresponding buttons 31*c* to 31*j*. In this way, the screen data having a high viewing frequency in the groups is set as the main screen data 22. Therefore, it is possible to display target screen data with less operation.

As explained above, with the control panel for machine tools 6 according to this embodiment, since operability is improved, even an unskilled person can easily grasp a procedure for moving a screen to a target screen.

In the control panel for machine tools 6 in this embodiment, the screen-data storing section 13 further stores the menu screen data 21 including the plurality of main screen corresponding buttons 31*c* to 31*j* in the constant display region 31 and including, in the variable display region 32, the plurality of second main screen corresponding buttons 21a to 21h respectively associated with the main screen data 22 as the operation buttons.

When the menu screen data 21 is displayed on the display section 11a and when receiving the short-input (the first input) on one of the plurality of second main screen corresponding buttons 21a to 21h, the control section 12 displays the main screen data 22 corresponding to the second main screen corresponding button on the display section 11a.

That is, when the menu screen data 21 is displayed on the display section 11a, in the display section 11a, the main screen corresponding buttons 31c to 31j are displayed in the constant display region 31 and the second main screen corresponding buttons 21a to 21h are displayed in the variable display region 32. Irrespective of whether the main screen data 22 and the sub-screen data 23 are displayed on the display section 11a or the menu screen data 21 is displayed on the display section 11a, the main screen corresponding buttons 31c to 31j are displayed in the constant display region 31. In this way, in the menu screen data 21, as in the main screen data 22 and the sub-screen data 23, the main screen corresponding buttons 31c to 31j are displayed in the constant display region 31. Consequently, the operator can perform consistent operation. Therefore, operability for the operator is improved.

Further, in the variable display region 32 of the menu screen data 21, the second main screen corresponding buttons 21a to 21h are displayed to correspond to the main screen corresponding buttons 31c to 31j. Therefore, display contents have a sense of unity. Operability of menu screen data 21 is satisfactory for the operator.

One of the main screen data 22 is a plurality of kinds of screen data 40, 50 including the list region 40a, 50a where, as the machine data, information sources, which are computer programs, tools, commands, or macros, are set as display targets and a name list of the information sources is displayed and the detailed information region 40b, 50b where detailed information related to a selected target selected out of the name list displayed in the list region 40a, 50a is displayed.

As the plurality of kinds of screen data 40, 50, a plurality of kinds of information can be displayed on one screen. In particular, the plurality of kinds of screen data 40, 50 are screen data having a high viewing frequency. Therefore, operability is improved for the operator by setting the plurality of kinds of screen data 40, 50 as one of the main screen data 22. Note that, in this embodiment, the program list screen data 40 and the tool list screen data 50 are explained as an example of the plurality of kinds of screen data. Besides, the screen data can include a command list screen data, a macro list screen data, and the like.

In the detailed information regions 40b, 50b, it is possible to switch and display a plurality of kinds of detailed information related to the selected target selected out of the name list. Consequently, in the plurality of kinds of screen data 40, 50 serving as the main screen data 22, the operator can easily grasp the name list and the detailed information of the name list.

One of the sub-screen data 23 is the single screen data 52 for setting, as the machine data, a plurality of information sources, which are a plurality of computer programs, a plurality of tools, a plurality of commands, or a plurality of macros, as display targets and displaying one information source among the plurality of information sources on one screen. In this case, when the single screen data 52 is displayed on the display section 11a, the control section 12 switches the currently displayed one information source to different one information source according to slide operation. Consequently, it is possible to switch, according to the slide operation easily understandable for the operator, the information source displayed in the single screen data 52.

One of the plurality of screen data 22, 23 is the operation result screen data 62 including the operation result display region 62a where operation result data of the machine tool 1 is displayed and the plurality of work shift type buttons 62b. In this case, when the operation result screen data 62 is displayed on the display section 11a and when receiving an input to the plurality of work shift type buttons 62b, the control section 12 switches the operation result data to operation result data related to a work shift corresponding to a (selected) work shift type, the input to which is received, and displays the operation result data. Consequently, the operator can easily grasp an operation result corresponding to the work shift type.

One of the plurality of screen data 22, 23 is the abnormal time screen data 72 displayed during abnormality of the machine tool 1 and including the abnormality diagnosis data collection button. In this case, when the abnormal time screen data 72 is displayed during abnormality of the machine tool 1 and when receiving an input to the abnormality diagnosis data collection button, the control section 12 performs automatic collection of abnormality diagnosis data. Consequently, the operator can easily acquire abnormality diagnosis data.

(16. Effect of the First Management System for Machine Tools)

The machine tool 1 (a part functioning as the first management system for machine tools) in this embodiment includes the screen-data storing section 13 configured to store the screen data 22, 23 for displaying maintenance information of maintenance target objects of the machine tool 1, the display section 11a provided in the control panel for machine tools 6 and configured to display the screen data 22, 23, the input section 11b configured to receive an input to the screen data 22, 23 displayed on the display section 11a, the management-information storing section 16 configured to store management information including at least one of maintenance periods and maintenance frequencies for the respective maintenance target objects, the present-state-information storing section 17 configured to store present state information including at least one of use periods and use frequencies for the respective maintenance target objects, and the control section 12 configured to display the management information and the present state information on the display section 11a.

When setting of the management information is performed by the input to the screen data 22, 23 displayed on the display section 11a, the control section 12 stores the set management information in the management-information storing section 16. Further, when an input of the present state information is performed by the input to the screen data 22, 23 displayed on the display section 11a, the control section 12 stores the input present state information in the present-state-information storing section 17.

The operator can freely set the management information of the maintenance target objects using the control panel for machine tools 6. For example, when the routine inspection is performed or replacement of the maintenance target objects is performed, the operator inputs, in the input section 11b of the control panel for machine tools 6, the present state information such as completion of execution of the routine inspection or completion of the replacement. Therefore, update of the present state information of the maintenance target objects stored in the present-state-information storing section 17 is performed. In this way, concerning the management of the maintenance target objects, the management is facilitated and operability is improved.

The screen-data storing section 13 stores, as the screen data 23, the life management screen data 63 (23) for life management of the maintenance target objects. The life management screen data 63 (23) includes the replacement button 63c. When receiving an input to the replacement button 63c of the life management screen data 63 (23) displayed on the display section 11a, the control section 12 resets the use frequency of the maintenance target object corresponding to the replacement button 63c in the present-state-information storing section 17. Consequently, the operator can easily perform processing after replacement of the maintenance target object of the life management by operating the input section 11b.

The management information includes the count-up condition for counting up the use frequencies concerning the respective maintenance target objects. In this case, when setting of the count-up condition is performed by an input to the life management screen data 63 (23) displayed on the display section 11a, the control section 12 stores the set count-up condition in the management-information storing section 16. That is, the operator can easily perform the setting of the count-up condition by operating the input section 11b.

When the maintenance frequencies are life values, when setting of a life value is performed by an input to the life management screen data 63 (23) displayed on the display section 11a, the control section 12 stores the set life value in the management-information storing section 16. Consequently, the operator can freely and easily perform the setting of the life value.

The management information includes the specified life ratios (notification conditions equivalent to predetermined ratios) to the life values. In this case, when setting of the specified life ratios (the notification conditions) is performed by an input to the life management screen data 63 (23) displayed on the display section 11a, the control section stores the set notification conditions in the management-information storing section 16. Consequently, the operator can set the specified life ratio corresponding to the maintenance target object of the life management.

The life management screen data 63 (23) includes the re-notification button 63d. The management information includes a re-notification condition equivalent to the predetermined ratio to the life value. In this case, the control section 12 displays a replacement message on the display section 11a when the use frequency satisfies the notification condition. When receiving an input to the re-notification button 63d after the replacement message is displayed, the control section 12 re-displays the replacement message on the display section 11a when the use frequency satisfies the re-notification condition. Consequently, after a first notification is performed, the operator can temporarily put off replacement. In this case, since the re-notification is performed, it is possible to surely perform the replacement before the life of the maintenance target object reaches the life value.

The control panel for machine tools 6 includes the replacement-history-information storing section 18 that stores the replacement history information for the respective maintenance target objects. The life management screen data 63 (23) includes the replacement history button 63e. In this case, when receiving an input to the replacement history button 63e of the life management screen data 63 (23) displayed on the display section 11a, the control section 12 displays replacement history information corresponding to the replacement history button 63e in the replacement-history-information storing section 18.

Therefore, the operator can easily grasp replacement history information in the past. For example, when notification of a first replacement message is performed, the operator can determine, after checking the replacement history information in the past, whether to replace the maintenance target object or perform input operation on the re-notification button 63d. When editing the specified life ratio, the user can use the replacement history information in the past.

The screen-data storing section 13 stores, as the screen data 22, the routine inspection screen data 80 (22) for routine inspection of the maintenance target objects. The routine inspection screen data 80 (22) includes the inspection completion button 80a1. In this case, when receiving an input to the inspection completion button 80a1 of the routine inspection screen data 80 (22) displayed on the display section 11a, the control section 12 resets the use period concerning the maintenance target object corresponding to the inspection completion button 80a1 in the present-state-information storing section 17. Consequently, the operator can easily carry out the routine inspection and perform reset processing of information after the routine inspection.

(17. Effect of the Second Management System for Machine Tools)

The machine tool 1 (a part functioning as the second management system for machine tools) in this embodiment includes the screen-data storing section 13 configured to store screen data for displaying machine data of the machine tool 1, the display section 11a provided in the control panel for machine tools 6 and configured to display the screen data 21, 22, and 23, the input section 11b configured to receive an input to the displayed screen data 21, 22, and 23, and the control section 12 configured to acquire an ON/OFF actual operation state of an operation target object and ON/OFF operation command information for the operation target object and display the ON/OFF actual operation state and the ON/OFF operation command information on the display section 11a.

That is, the ON/OFF actual information operation state and the ON/OFF operation command information of the operation target object is displayed on the display section 11a of the control panel for machine tools 6. The operator determines that the operation target object is normal when the ON/OFF actual operation state and the ON/OFF operation command information coincide with each other and determines that the operation target object is abnormal when the ON/OFF actual operation state and the ON/OFF operation command information do not coincide with each other. In this way, both of the ON/OFF actual operation state and the ON/OFF operation command information are displayed on the display section 11a of the control panel for machine tools 6. Therefore, the operator can grasp at a glance whether the operation target object is normal or abnormal. In a state in which the operator grasps both of the ON/OFF actual operation state and the ON/OFF operation command information, the operator can check an actual state of the operation target object. Therefore, it is easy for the operator to grasp an abnormal state according to one kind of screen information.

One of the screen data 23 stored in the screen-data storing section 13 is the signal state screen data 64 (23) including the list region 64a where the ON/OFF actual operation state and the ON/OFF operation command information concerning the operation target object are displayed and the image region 64*b* where an image of the operation target object is displayed. In this case, the control section 12 displays, in the image region 64*b*, the image associated with the operation target object displayed in the list region 64*a* in the signal state screen data 64 (23). That is, the operator can grasp a presence position of the operation target object while checking the ON/OFF actual operation state and the ON/OFF operation command information of the operation target object on one display section 11*a*. Therefore, when an abnormal operation target object is present, it is extremely easy to actually check the operation target object.

The signal-state screen data 64 (23) includes the plurality of unit buttons 64*c* corresponding to the respective component units of the machine tool 1. When the signal state screen data 64 (23) is displayed on the display section 11*a* and when receiving an input to one of the plurality of unit buttons 64*c*, the control section 12 performs operation explained below. The control section 12 displays, in the list region 64*a*, the ON/OFF actual operation state and the ON/OFF operation command information concerning the operation target object included in the component unit corresponding to the unit button 64*c* and displays the image concerning the corresponding component unit in the image region 64*b*. In this way, the unit buttons 64*c* are classified for each of the component units. Therefore, the operator can easily grasp the operation target object.

One of the screen data 23 stored in the screen-data storing section 13 is the program screen data 90 (23) for displaying a sequence program. In this case, the ON/OFF operation command information is ON/OFF operation command information by the sequence program. The signal state screen data 64 (23) includes the program button 64*d*.

When receiving an input to the program button 64*d* of the signal state screen data 64 (23) displayed on the display section 11*a*, the control section 12 displays, on the display section 11*a*, the program screen data 90 (23) concerning the operation target object displayed in the list region 64*a*. Further, when the program screen data 90 (23) is displayed on the display section 11*a*, the control section 12 performs ON/OFF display corresponding to the ON/OFF operation command information in the displayed sequence program. Therefore, when confirming that the operation target object is abnormal in the signal state screen data 64 (23), the operator can immediately check states before and after a relevant part by checking the sequence program.

The control section 12 performs enlargement or reduction of the image displayed in the image region 64*b* according to enlargement operation or reduction operation for the image region 64*b* displayed on the display section 11*a*. Consequently, the operator can grasp, with easy operation for the image region 64*b*, in which position of the machine tool 1 the operation target object is present.

The invention claimed is:

1. A control panel for machine tools comprising:
a memory configured to store a plurality of screen data for displaying machine data of a machine tool including operation buttons;
a display configured to display screen data including at least one of the plurality of screen data;
an input interface configured to receive an input to the operations buttons of the screen data displayed on the display; and
a controller configured to change, on the basis of the input to the operation buttons displayed on the display, the screen data displayed on the display, wherein the plurality of screen data are classified into a plurality of groups and classified into main screen data and sub-screen data associated with the main screen data in each of the groups,
the memory further stores list display data in which the sub-screen data in the groups are displayed as a list,
all of the plurality of screen data include, in a constant display region, as the operation buttons, a plurality of first main screen buttons each associated with a respective main screen data,
when receiving a first input on one of the plurality of first main screen buttons, the controller displays the main screen data corresponding to the first main screen button which received the first input on the display,
when receiving a second input different from the first input on one of the plurality of first main screen buttons, the controller displays the list display data of the sub-screen data related to the main screen data corresponding to the first main screen button which received the second input on the display,
when receiving input to the list display data, the controller displays the sub-screen data corresponding to the list display data which received the input on the display,
the memory further stores menu screen data including the plurality of first main screen buttons in the constant display region and including, in a variable display region, a plurality of second main screen buttons each associated with the respective main screen data as the operation buttons, and
when the menu screen data is displayed on the display and when receiving the first input on one of the plurality of second main screen buttons, the controller displays the main screen data corresponding to the second main screen button which received the first input on the display.

2. The control panel for machine tools according to claim 1, wherein one of the main screen data is a plurality of kinds of screen data including;
a list region where, as the machine data, information sources, which are computer programs, tools, commands, or macros, are set as display targets and a name list of the information sources is displayed, and
a detailed information region where detailed information related to a selected target selected out of the name list displayed in the list region is displayed.

3. The control panel for machine tools according to claim 2, wherein, in the detailed information region, a plurality of kinds of detailed information related to the selected target selected out of the name list can be switched and displayed.

4. The control panel for machine tools according to claim 1, wherein
one of the sub-screen data is single screen data for setting, as the machine data, a plurality of information sources, which are a plurality of computer programs, a plurality of tools, a plurality of commands, or a plurality of macros, as display targets and displaying one information source among the plurality of information sources on one screen, and
when the single screen data is displayed on the display, the controller switches the currently displayed one information source to different one information source according to slide operation.

5. The control panel for machine tools according to claim 1, wherein
one of the plurality of screen data is operation result screen data including an operation result display region where operation result data of the machine tool is displayed and a plurality of work shift type buttons, and when the operation result screen data is displayed on the display and when receiving an input to the plurality of work shift type buttons, the controller switches the operation result screen data to the operation result data related to a work shift corresponding to a work shift type, the input to which is received, and displays the operation result data.

6. The control panel for machine tools according to claim 1, wherein one of the plurality of screen data is abnormal time screen data displayed during an abnormality of the machine tool and including abnormality diagnosis data collection button, and when the abnormal time screen data is displayed during abnormality of the machine tool and when receiving an input to the abnormality diagnosis data collection button, the controller performs automatic collection of abnormality diagnosis data.

7. The control panel for machine tools according to claim 6, wherein the controller or an operator transmit the abnormality diagnosis data to an external server or an analysis system through a network.

8. The control panel for machine tools according to claim 1, wherein one of the first main screen buttons and one of the second main screen buttons are associated with the same main screen data.

* * * * *